(12) United States Patent
Williams

(10) Patent No.: US 11,443,608 B2
(45) Date of Patent: Sep. 13, 2022

(54) WEARABLE DEVICES

(71) Applicant: Wearable Link Limited, Bromsgrove (GB)

(72) Inventor: Thomas James Williams, Bromsgrove (GB)

( * ) Notice: Subject to any disclaimer, the term of this patent is extended or adjusted under 35 U.S.C. 154(b) by 387 days.

(21) Appl. No.: 16/628,257

(22) PCT Filed: Jul. 3, 2018

(86) PCT No.: PCT/GB2018/051870
§ 371 (c)(1),
(2) Date: Jan. 2, 2020

(87) PCT Pub. No.: WO2019/008346
PCT Pub. Date: Jan. 10, 2019

(65) Prior Publication Data
US 2022/0114873 A1 Apr. 14, 2022

(30) Foreign Application Priority Data
Jul. 5, 2017 (GB) ..................................... 1710789

(51) Int. Cl.
| G08B 21/00 | (2006.01) |
| G08B 21/02 | (2006.01) |
| G08B 21/22 | (2006.01) |
| H04W 4/021 | (2018.01) |

(52) U.S. Cl.
CPC ..... *G08B 21/0269* (2013.01); *G08B 21/0261* (2013.01); *G08B 21/22* (2013.01); *H04W 4/022* (2013.01)

(58) Field of Classification Search
CPC .................................................. G08B 21/0269
See application file for complete search history.

(56) References Cited

U.S. PATENT DOCUMENTS

| 5,490,286 A | 2/1996 | Kah |
| 8,976,721 B1 | 3/2015 | Chhabra |
| 11,039,273 B1* | 6/2021 | Dym ..................... H04W 4/022 |
| 2010/0117821 A1 | 5/2010 | Cruz |
| 2014/0104063 A1 | 4/2014 | Troxler |
| 2015/0310729 A1* | 10/2015 | Lampert .............. G08B 27/001 340/539.11 |

(Continued)

FOREIGN PATENT DOCUMENTS

| CN | 104954981 A1 | 9/2015 |
| DE | 102007042556 A1 | 3/2009 |
| JP | H0767164 A1 | 3/1995 |

*Primary Examiner* — Travis R Hunnings

(57) ABSTRACT

A geofencing system (100) comprises at least one physical, moveable marker (102), the or each marker being arranged to define at least part of a geofence (106) based on the position of the moveable marker (102) such that changing the position of the or each moveable marker (102) changes the geofence (106). The or each marker (102) is arranged to provide a visible and/or audible indication of geofence (106). The system (100) also comprises at least one wearable device (104) arranged to receive data concerning the position of the geofence (106). The wearable device (104) is arranged to store up-to-date geofence information and to provide an alert in response to the wearable device (104) crossing the geofence (106).

14 Claims, 21 Drawing Sheets

(56) References Cited

U.S. PATENT DOCUMENTS

| | | | |
|---|---|---|---|
| 2016/0116596 A1* | 4/2016 | Rajala | G01S 5/0263 |
| | | | 342/357.54 |
| 2016/0117910 A1* | 4/2016 | Rajala | G08B 21/22 |
| | | | 340/539.13 |
| 2016/0321898 A1* | 11/2016 | Braxton | H04W 4/021 |
| 2017/0150308 A1* | 5/2017 | Jones | G06F 21/604 |

* cited by examiner

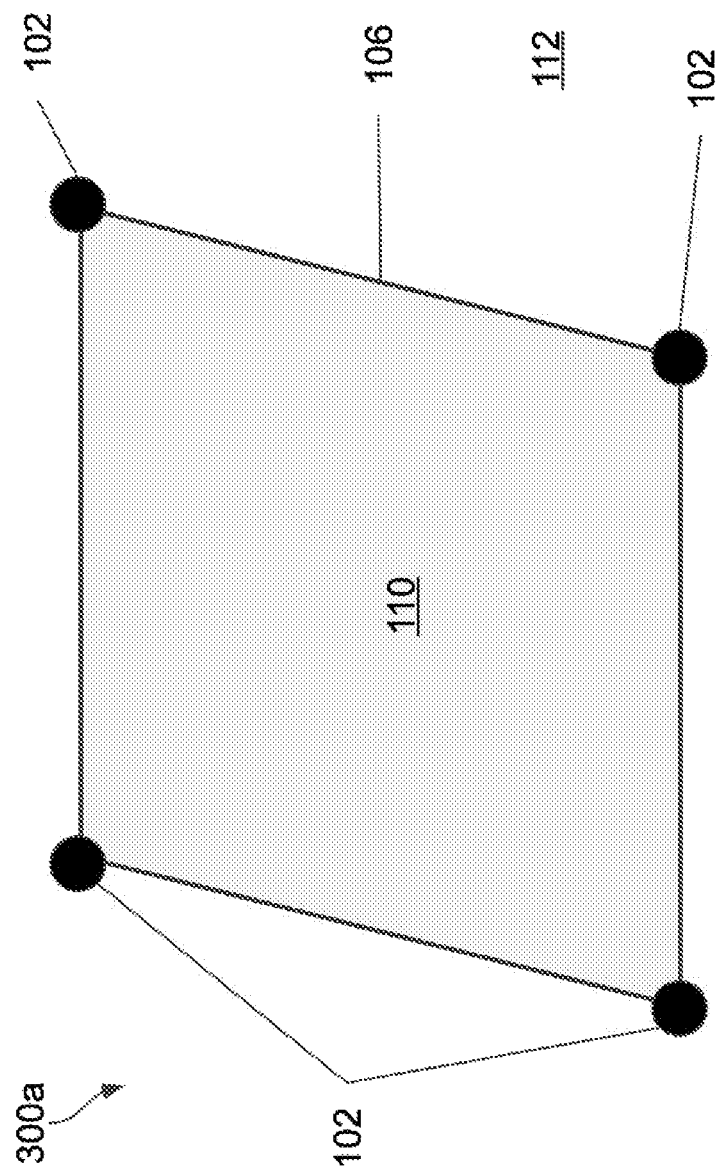

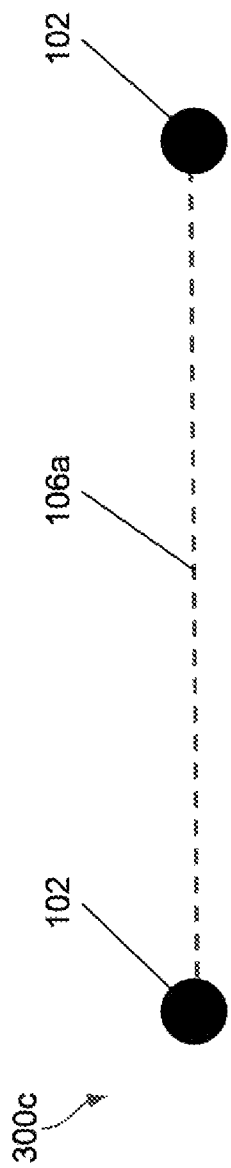
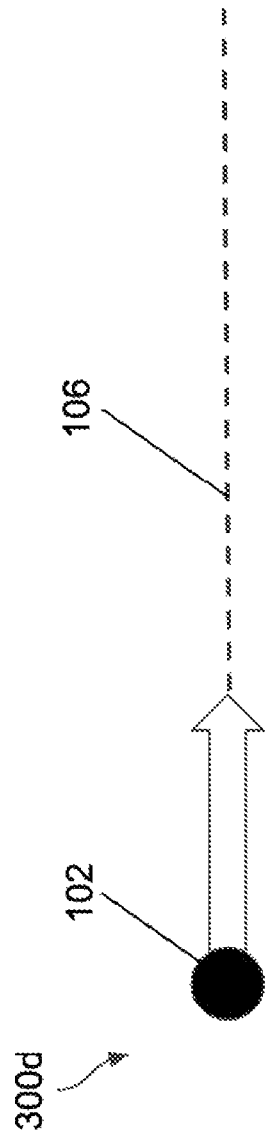
FIGURE 3C
FIGURE 3D

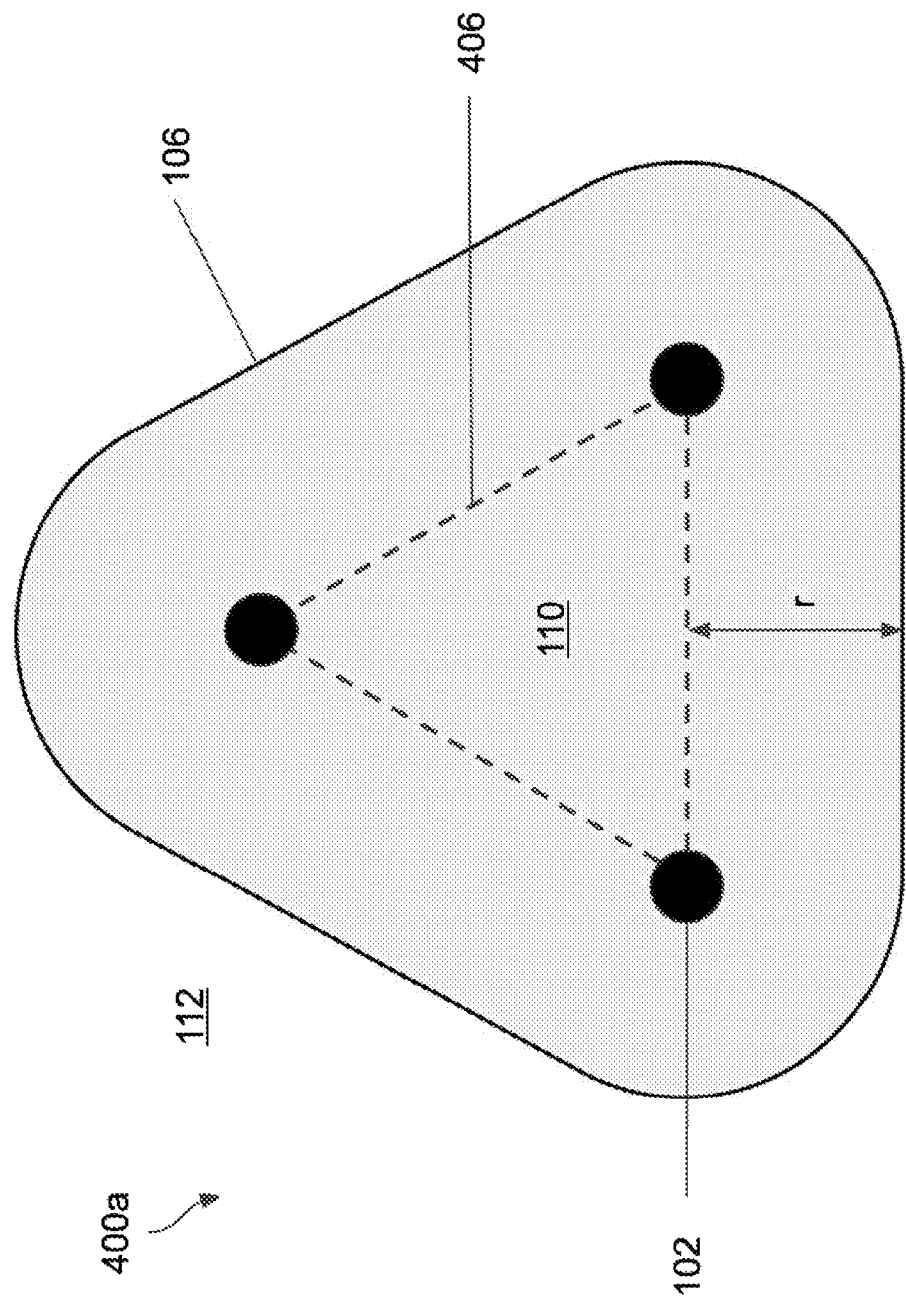

WEARABLE DEVICES

This invention relates to wearable devices, a geofencing system comprising one or more physical, moveable markers which indicate the presence of the geofence and can be moved to change the geofence, and to a system for updating the geofence. The invention may have particular application for safety, for example indicating a safe area of the ocean for swimming, dangerous areas of building sites or ski slopes to avoid, or the likes, and/or providing an alert when a user is in need of assistance, but it need not be limited to these uses.

According to a first aspect of the invention, there is provided a geofencing system comprising:
- at least one physical, moveable marker, the or each marker being arranged to define at least part of a geofence based on the position of the moveable marker such that changing the position of the or each moveable marker changes the geofence, and wherein the or each marker is arranged to provide a visible and/or audible indication of geofence; and
- at least one wearable device arranged to receive data concerning the position of the geofence. The wearable device is arranged to store geofence information (preferably up-to-date geofence information) and to provide an alert in response to the wearable device crossing the geofence.

The system optionally comprises only a single marker. In such cases, optionally either:
(i) the marker visibly indicates a direction, and the geofence comprises a line in the direction indicated; or
(ii) the geofence comprises a radius around the single marker.

The geofence information stored by the wearable device may be updated each time a marker is moved, and/or at regular intervals—this may be described as up-to-date geofence information.

The or each marker may indicate a direction in which the geofence extends therefrom, optionally with a clearly visible arrow.

The or each marker may be arranged to indicate at least one of the presence of the geofence and the shape of the geofence.

The system optionally comprises a plurality of markers. The markers may define corners of a polygonal geofence.

The or each wearable device may be arranged to listen at set times (for example by activating a receiver at/around the set times and deactivating it therebetween) to receive updates to the geofence information resulting from movement of one or more of the markers. Optionally, the or each marker and/or a server may be arranged to send information at the set times.

Optionally, in such embodiments, the listening and sending may be synchronised using a real-time clock of a GNSS system, and/or using a hard-coded, or otherwise provided, time sequence to determine the set times.

The or each marker may be equipped with at least one of GNSS capability and radio communication capability.

The system may further comprise an app arranged to allow modification of a geofence defined by the one or more markers. In such embodiments, the app may be arranged to allow setting of an offset and/or of one or more boundary conditions.

The at least one wearable device may be arranged to provide data on a position of the wearable device to the marker and the marker may be arranged to log position data of the at least one wearable device.

The or each marker may be arranged to be easily visible to a viewer at a distance; for example being at least one of illuminated, fluorescent, brightly coloured, and a contrasting colour to a surrounding environment.

The or each marker may be arranged to communicate wirelessly with the wearable device directly. The or each marker may be arranged to communicate wirelessly with a server, and in such embodiments the server may be arranged to communicate wirelessly with the or each wearable device.

The or each wearable device may be arranged to receive data on the position of the at least one marker and to determine the geofence information using the position data. The system or each marker, or a central server, may be arranged to determine the geofence information from marker position data. The or each wearable device may be arranged to receive the geofence information wirelessly. The or each marker may be arranged to be portable, and preferably to be portable by an individual. The or each marker may be lightweight, for example weighing less than 1 kg, less than 750 g. less than 500 g. or less than 200 g, or less than 150 g.

The or each marker may have sensing capabilities, for example the capability to detect wind, certain gases, pressure, and/or temperature. In such embodiments, the or each marker may be arranged to create or change the geofence based on sensed conditions. Additionally or alternatively, the or each marker may be arranged to transmit an alert to the at least one wearable device based on sensed conditions.

The or each device optionally has an emergency mode, and may be arranged to transmit a signal in response to activation of the emergency mode.

The or each marker may be arranged to broadcast a message to at least one of the wearable devices if one of the wearable devices crosses the geofence. In such embodiments, a GNSS timestamp may be used to time broadcasting of the message. The at least one wearable device may be arranged to enter a different mode and/or to perform a different function on approaching or crossing the geofence. The or each wearable device may be arranged to change configuration in response to a trigger, wherein the trigger may be one or more of:
(i) a message received from one of the markers;
(ii) a message received from another wearable device;
(iii) a message received from a central server;
(iv) the wearable device crossing the geofence;
(v) the wearable device coming within a set distance of the geofence; and
(vi) a condition sensed by the wearable device.

The one or more markers may be arranged to be arranged based on knowledge of safety conditions of an environment of the markers.

According to a second aspect of the invention, there is provided a geofencing system comprising:
- at least one wearable device arranged to receive data concerning a geofence and to alert a user if one or more trigger events occur; and
- a geofence data source arranged to communicate wirelessly with the at least one wearable device. The geofence data source is synchronised with the wearable device and arranged to transmit geofence data to the wearable device at set times, and wherein the wearable device is arranged to enter a listening mode to listen for the transmitted geofence data only at around the set times, and to change configuration and/or register a trigger event, or not as appropriate, based on the geofence data.

The geofence data may comprise changes to the shape and/or location of the geofence, such as updated geofence coordinates. The geofence data may comprise a change to, or addition of, a trigger event of the one or more trigger events. The trigger events may comprise one or more of:
- (i) the wearable device coming within a set distance of the geofence;
- (ii) the wearable device crossing the geofence;
- (iii) the geofence having been updated;
- (iv) the wearable device detecting a sensed condition, the sensed condition passing a set threshold; and
- (v) the wearable device receiving geofence data regarding a sensed condition.

In such embodiments, the sensed condition may be one of temperature, smoke detection, wind detection and chemical detection.

The configuration change may comprise one or more of:
- (i) updating a polling frequency for contact between the at least one wearable device and the geofence data source;
- (ii) updating the set times for future listening and transmission;
- (iii) updating geofence shape or location;
- (iv) changing the alert type; and
- (v) entering or cancelling an emergency mode in which wearable device location is broadcast.

The set times may be set prior to use and may be maintained by real-time clocks or GNSS systems on the wearable device and on the geofence data source. The wearable device and the geofence data source may use a real-time clock of a GNSS system for synchronisation.

The wearable device may be arranged to process the location of the wearable device in relation to the received geofence data.

The system may further comprise an access point and/or one or more further wearable devices; the wearable device may be arranged to communicate therewith.

The wearable device may be arranged to record device position data regarding its position. The device position data may be arranged to be transmitted; and optionally the device position data may be simplified before transmission. The wearable device may be arranged to transmit its position information only on crossing the geofence.

The wearable device may have an emergency mode, and may be arranged to immediately transmit device position information on activation of the emergency mode.

The wearable device may be arranged to enter the listening mode for a set period of less than 500 ms, and preferably less than 200 ms, at a time. The wearable device may be arranged to enter the listening mode at intervals corresponding to a time sequence known by the device and the geofence data source, for a set period each time.

The geofence data source may be, or may comprise, one or more moveable physical markers arranged to define at least part of a geofence based on the position of the or each moveable marker such that changing the position of the moveable marker changes the geofence. In such embodiments, the system may be arranged to allow at least one of direct and/or indirect wireless communication between marker(s) and wearable device. At least one of the one or more moveable physical markers may be arranged to transmit the geofence data to the wearable device. The geofence data source may be, or may comprise, an access point/server.

According to a third aspect of the invention, there is provided a method of updating a geofencing system of the first aspect of the invention, the method comprising:
synchronising the at least one wearable device with the at least one physical, moveable marker, the at least one physical, moveable marker being arranged to transmit geofence data to the wearable device at set times, and wherein the wearable device is arranged to enter a listening mode to listen for the transmitted geofence data only at around the set times, and to change configuration and/or register a trigger event, or not as appropriate, based on the geofence data.

According to a fourth aspect of the invention, there is provided an alert system comprising a plurality of wearable devices arranged to form a mesh network therebetween; and an access point arranged to relay data from any wearable device of the plurality of wearable devices to a centrally controlled network (CCN). Each wearable device is configured such that:
- (i) when an alert is initiated at a first wearable device of the plurality of wearable devices, a signal corresponding to the alert and comprising an indication of the location of the wearable device at which the alert was initiated is automatically passed directly to the access point when the first wearable device can connect to the access point directly, and is passed to another wearable device of the plurality of wearable devices when the first wearable device cannot connect to the access point directly; and
- (ii) when a first wearable device receives a signal corresponding to the alert from another wearable device, the first wearable device automatically passes the signal to the access point when the first wearable device can connect to the access point directly, and passes the signal to a further wearable device of the plurality of wearable devices when the first wearable device cannot connect to the access point directly.

The wearable devices may automatically pass the signal from one to the next until the signal reaches a wearable device that can contact the access point, at which point the signal may be sent to the centrally controlled network via the access point. Each wearable device may send the signal on to a specific second wearable device, or may broadcast the message locally across the mesh network, to be received by any wearable device on the network.

The system may be a safety system. The system may be designed for use by people engaged in sports such as hiking, mountaineering, skiing, climbing or the likes for which there are risks and a likelihood of being in remote areas. The system may be designed for use in remote or hazardous areas, and/or for search and rescue purposes. The system may be designed for use in construction or firefighting environments, and may have particular utility in providing a reliable alert mechanism for lone or isolated workers. The system may be designed for use in mass participation events, such as marathons or festivals.

The wearable devices may additionally have geofencing capabilities. The wearable devices may be as described in any preceding aspects. The wearable devices may be geosensors and/or geomarkers as described herein. Non-wearable geo-markers or geo-sensors may also form a part of the mesh network, alongside the wearable devices. Triggers, updated geofence coordinates and the likes may be passed through a mixture of wearable devices. CCN devices, geo-markers and geosensors.

Once a wearable device of the plurality of wearable devices has relayed the signal to the access point, that wearable device may await confirmation that the signal has been successfully passed on, and may relay the signal to another wearable device if such confirmation is not received from the access point.

The system may be arranged to keep passing the signal between wearable devices until the signal is successfully passed to the centrally controlled network. If no wearable device of the plurality of wearable devices is able to contact the access point, the wearable device closest to the last known location at which the access point was contactable may be provided with an indication to return to that location such that the alert may be passed on.

Once a wearable device of the plurality of wearable devices has received confirmation that the signal has been successfully passed to the centrally controlled network from the access point, a message may be returned to the wearable device at which the alert was initiated, the message may confirm successful sending of the signal and/or may provide a list of wearable devices via which the signal was passed.

If a wearable device of the plurality of wearable devices is moved such that the wearable device can no longer connect to either the access point or any other wearable device of the plurality of wearable devices, the wearable device may be configured to provide a warning of the loss of contact. The warning may be or comprise an audio, visual, and/or tactile alarm. The warning of loss of contact may include an indication of the last known location in which contact was possible, and/or directions for getting there.

The signal corresponding to the alert may be arranged to automatically contact a source of assistance (e.g. one or more of emergency services, other firefighters in a team, mountain search and rescue, coast guard, lifeguard station, a site foreman or first aider on a construction site, ski resort control station or the likes) and provide the location of the wearable device at which the alert was initiated.

The centrally controlled network may be arranged to use a different communication protocol from the mesh network, and the signal may be passed to the access point whether or not the wearable devices relaying the message can interpret the signal. The signal may comprise a local message (e.g. a local broadcast message) interpretable by the wearable devices and a network message interpretable by the centrally controlled network (whether or not it is interpretable by the wearable devices).

The wearable devices may be watches, wrist- or ankle-bands, necklaces or the likes. The wearable devices may be embedded into a helmet, hat, article of clothing, climbing harness, article of personal protective equipment (e.g. goggles, car defenders, headphones or the likes), or another wearable accessory.

The skilled person will appreciate that the system of the fourth aspect may improve reliability of communications for a user, so potentially improving response times. The local mesh connection may be used if a direct connection with an access point is not possible, and/or if data is to be routed locally (and optionally not also to the network).

The access point may be a stationary access point; for example comprising a receiver on a roof of an office of a ski resort, a module built into a ski lift tower, or the likes. The skilled person will appreciate that the access point may alternatively be a mobile access point; for example a cell phone or a module in a support vehicle.

According to a fifth aspect of the invention, there is provided a method of summoning assistance using a plurality of wearable devices arranged to form a mesh network therebetween and an access point arranged to relay data from any wearable device of the plurality of wearable devices to a centrally controlled network. The method comprises:
  at a first wearable device of the plurality of wearable devices, initiating an alert;
  by the first wearable device, automatically passing a signal corresponding to the alert directly to the access point when the first wearable device can connect to the access point directly, and passing the signal to a second wearable device of the plurality of wearable devices when the first wearable device cannot connect to the access point directly;
  if the signal is passed to the second wearable device, the second wearable device automatically passing the signal corresponding to the alert directly to the access point when the second wearable device can connect to the access point directly, and passing the signal to a third wearable device of the plurality of wearable devices when the second wearable device cannot connect to the access point directly (the third wearable device may repeat these steps, and so on until the access point is reached); and, once the signal has been received by the access point, the access point automatically relaying the signal to a source of assistance, the signal comprising the location of the wearable device at or for which the alert was initiated.

The method may be performed using the system of the fourth aspect. The wearable devices may be as described in any preceding aspect. In various embodiments, the alert may be initiated actively by a user (e.g. a user pressing a "help" button on his or her wearable device, or giving a vocal command interpreted by the device, or may be automatically initiated by the user's wearable device in response to a trigger (e.g. due to heart rate and/or blood pressure passing above or below a threshold, or a failure to confirm "all ok" after a sudden change in altitude or acceleration or fall detection, or after a threshold period of inactivity, in response to a sensed temperature passing above or below a threshold, or in response to detection of a hazardous gas, temperature, or radiation exposure (e.g. UV)). In some embodiments, a user of a different wearable device may be able to initiate an alert for the first wearable device; for example on seeing that the user of the first wearable device is injured.

Each wearable device may comprise (for example, saved in a local memory of the wearable device) a look-tip table (or equivalent) of wearable device IDs corresponding to the plurality of wearable devices and qualities of a user corresponding to that wearable device ID. The method may further comprise the first wearable device automatically selecting one or more wearable device IDs corresponding to one or more users most suited to providing assistance, and providing the location of the first wearable device and an alert notice to the wearable devices corresponding to the selected wearable device IDs via the mesh network. The qualities listed may include whether the person is an instructor or a participant, first aid training or ability, mountain rescue qualification or ability, lifeguarding qualification or ability, possession of a first aid kit, possession of specific medicine or items (e.g. foil blankets, EpiPens®, buoyancy aids), or the likes.

Each wearable device may keep a record of a last known location of each other wearable device and the method may further comprise the first wearable device automatically providing the location of the first wearable device and an alert notice (e.g. a text message requesting assistance) to one or more wearable devices listed in the record as being closest to the first mobile device.

The skilled person will appreciate that features discussed in relation to any one aspect of the invention may be provided with any other aspect of the invention.

Embodiments of the invention will now be described in more detail by way of example only with reference to the accompanying drawings in which like reference numerals are used for like features:

FIGS. 3a to 3d show four different geofence types that can be created using markers, in line with various embodiments:

FIGS. 4a to 4c show three different geometric arrangements of markers to create geofences in line with various embodiments;

FIG. 9b shows a communication diagram of an alternative communication route for the devices used in some embodiments as shown in FIG. 9a;

Figure 1:
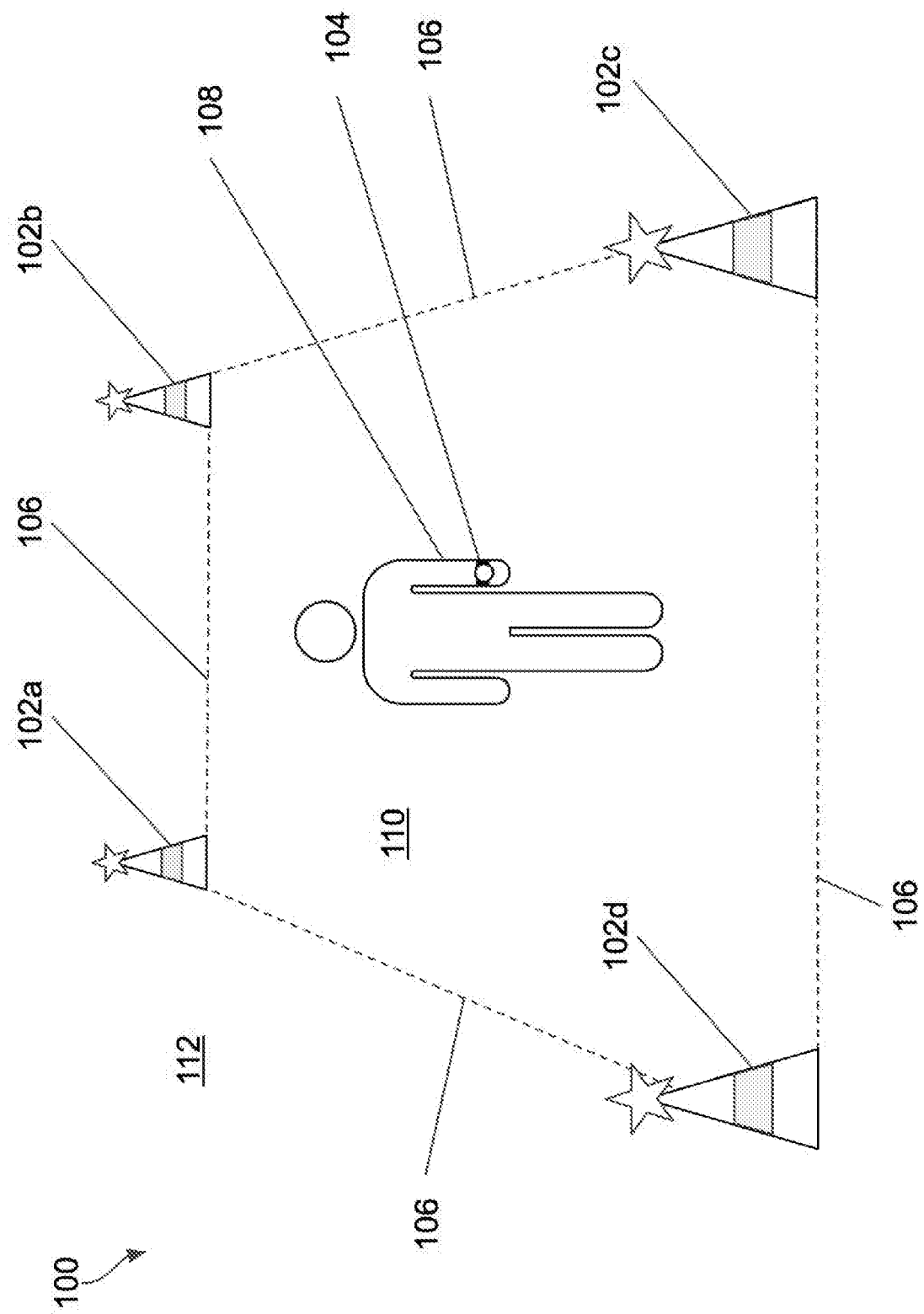
FIG. 1 is a schematic view of a geofencing system of an embodiment.

FIG. 1 shows a geofencing system 100 comprising four markers 102a-102d. A geofence 106 is formed based on the location of the markers 102a-102d. The markers 102a-102d form vertices of the geofence 106 in this embodiment. The geofence 106 separates the environment into a first region 110 inside the geofence 106 and a second region 112 outside of the geofence 106.

A user 108 is wearing a device 104. In the embodiment shown, the device 104 takes the form of a wristwatch and is worn on the user's arm. The device 104 may therefore be referred to as a wearable device 104 or "wearable". In alternative embodiments, the device 104 may be carried instead of worn, may be embedded inside of clothing, or may be worn elsewhere and/or take a different form. The skilled person will appreciate that the shape and size of the device 104 are not to be limited by the example shown.

In the embodiment being described, each marker 102 comprises a GNSS-receiver (e.g. GPS—GNSS is the global name for GPS (American) GLONASS (Russian), Gallileo (European) and Beidou (China)). Using the GNSS receiver, each marker 102 can triangulate its position from received signals from a network of satellites. The marker 102 calculates its location and then communicates this position to other markers 102, wearable devices 104, Access points and/or other entities in the network. Each marker 102 can therefore establish and broadcast its position.

A processor (which may be part of a device 104, or in an access point or the likes as described later) identifies the marker 102 as forming part of the geofence 106 and therefore can assign geographic conditions (e.g. within or outside the geofence 106, approaching the geofence 106, etc.) to itself and/or to devices 104 that operate within communications range of it.

In the embodiment being described, the device 104 has a user interface which allows a user 108 to see the shape and size of the geofence 106 and the user's position relative to the geofence. In the embodiment being described, the device 104 is arranged to sound an alarm if or when the user 108 crosses the geofence 106.

The device 104 is arranged to receive data from the markers 102a-102d. In the embodiment shown, the data comprise position information of each marker 102 and an ordering of the markers (e.g. 102a-102b-102c-102d-102a) so as to define the size and shape of the geofence 106.

In alternative or additional embodiments, no ordering of the markers 102 may be provided; the device 104 may instead determine the shape of the geofence 106 to be the largest single polygon, or the smallest number of polygons possible, or the likes, based on the position information.

In the various embodiments, the markers 102 are arranged to visibly and/or audibly indicate the presence and/or shape of a geofence 106 (i.e. the presence of the markers 102 indicates that a geofence is present—the presence may be indicated visually (i.e. a user can see the marker) and/or audibly (i.e. a user can hear a sound emitted by the marker); the relative location of a plurality of markers, and/or an arrow or other marker associated with an individual marker, may show the shape of the geofence). Preferably, the markers 102 are arranged such that the presence and/or shape of the geofence 106 is indicated to a user who is at a distance from the markers 102, for example by being at least one of highly visible, fluorescent, illuminated or audible.

In the embodiment being described, the markers 102 are arranged to be easily visible to the user 108 so as to provide a visual indication of the location and shape of the geofence 106, or at least of a region of the geofence 106 near to the user 108, depending on the size of the geofence 106 and/or on obstructions in the environment. The markers 102 are designed such that the geofence 106 is clearly identifiable for a user 108, even if that user 108 is not looking at his or her device 104.

In the embodiment being described, each marker 102 is brightly-coloured and has a flashing light attached thereto. In alternative or additional embodiments, each marker 102 may be arranged to make a noise (e.g. beeping or playing music) so as to allow a user 108 to locate the geofence 106 by sound.

The markers 102 are therefore arranged to link real world areas/features to a virtual map, and to indicate to people in the vicinity that there is a geofence 106. In some embodiments, such as marking of a ski piste, a danger area may be marked by a clearly visible rope perimeter or a series of poles. Some or all of the poles may be markers 102. The perimeter can be inputted accurately into the system 100, 200 as a geofence 106 by receiving geofence data (position information, possibly with an associated direction) from the markers 102. During normal operation, these poles signify the real-world location of the geofence 106. Similarly, in a building site or the likes, traffic cones, a fence or similar may be used to mark out a dangerous area. One or more of the cones may have a device 104 attached thereto so that the cone with the device acts as a marker 102 to create a geofence marking the dangerous area. A site manager may locate and monitor the markers 102. The system 100, 200 may be arranged to notify the site manager if any staff entered the restricted area 110.

The markers 102 are therefore rearranged based on knowledge of the safety conditions of the environment, be that a building site or a ski piste or any other environment.

In the embodiment being described, each marker 102 is human-portable, i.e. a person can pick up and carry the marker 102. The markers 102 are therefore designed to be relatively low weight.

In the embodiment being described, the device 104 stores data on the location of the geofence 106 and, when or if a marker 102 is moved, the marker 102 sends updated position information to the device 104. The sending may be direct or indirect; for example, the marker 102a may send its position information to the device 104 directly, via a repeater, via a server, via a central processor, via another marker 102b-d, a combination of the above, or the likes.

The geofence 106 is updated according to the updated position information. The device 104 is arranged to alert the user 108 to the change of the geofence 106 and to indicate the shape and location of the updated geofence 106, for example by flashing or emitting a sound (e.g. a beep or buzz, or "geofence updated" speech sample, or the likes). In the embodiment being described, the device 104 has a screen and a map showing the geofence 106 and the user's location relative to the geofence 106 is displayed on demand.

In some embodiments, each device 104 has an emergency button, which may be a physical button, a touch-screen interface, or the likes, which causes the device 104 to send the emergency signal and to enter an emergency mode in which device position is broadcast, or is broadcast more frequently.

In the embodiment being described, the device 104 receives geofence data from the markers 102 and determines the shape and position of the geofence 106 accordingly.

In alternative or additional embodiments, a remote processor may receive the geofence data, determine the shape and position of the geofence 106 and transmit the geofence coordinates to the device 104. Some or all of the processing may therefore be offloaded to remote entities instead of being performed by the device 104.

In the embodiment being described, the wearable device 104 is arranged to provide data on its position (and therefore on the position of the associated user 108) to a marker 102 and the marker is arranged to log position data of the device 104. In search and rescue operations, for example, the marker 102 can therefore provide useful position information on the latest reported location of the device 104 even if the device 104 has subsequently been damaged or lost contact.

In some embodiments, the markers 102 can therefore be used as a logging tool to record the location of users 108 during an incident. It is also possible to use markers 102 in search and rescue operations where people without devices 104 may have been trapped within a collapsed building or avalanche. The location and time of discovery can be logged by users 108 working with a search and rescue team for review by placing a marker 102 at the relevant location. Similarly, the marker 102 may be arranged to provide an alert if a device 104 crosses the geofence 106, or if a device 104 loses contact or sends an emergency signal. Therefore an alert can be raised even if the device 104 is damaged, destroyed, or too low on power to transmit an alert.

The markers 102 may be described as geo-markers 102. A geo-marker 102 is or comprises an object such as a cone or flag that indicates a real world boundary or point. Geo-markers 102 creates a link between a map and the real world. A Geo-marker 102 should be clearly visible in plain sight in most cases. Geomarkers 102 may be particularly useful in places where an aerial photograph may not be up to date or where it is difficult to pinpoint a location e.g. in water, on snow, on a beach or on a building site etc.

The markers 102 are arranged to transmit their position. In the embodiments being described, the markers 102 can be equipped with a GNSS (Global Navigation Satellite System) capability or use radio to triangulate position. The skilled person will appreciate that any suitable communication means may be used.

The skilled person will appreciate that, due to the commonality in functionality, markers 102 and devices 104 may be used interchangeably. In some embodiments, the geofence boundary 106 may be formed by a single person wearing a device 104, with the device functioning as a marker. In alternative or additional embodiments, the geofence boundary 106 may be formed by a group of people each wearing a device 104.

In such embodiments, the one or more people wearing devices 104 which are set to function as markers 102 are visibly distinguishable from the other people, for example by virtue of a particular uniform, or carrying or wearing a particular item, which may give out a light or an audible signal.

The skilled person will appreciate that the shape of the geofence 106 formed by these devices 104 can have some or all of the same features described below for geofences 106 formed by markers 102. Further, a combination of one or more devices 104 and one or more markers 102 may be used as markers 102 to form a geofence 106 at any one time.

The use of devices 104 as markers may be utilised, for example, where security personnel are required to monitor a perimeter 106, or where it is required that an area (the area 110 within the geofence 106) is visually monitored by medical or support staff, or the likes.

Figure 2:
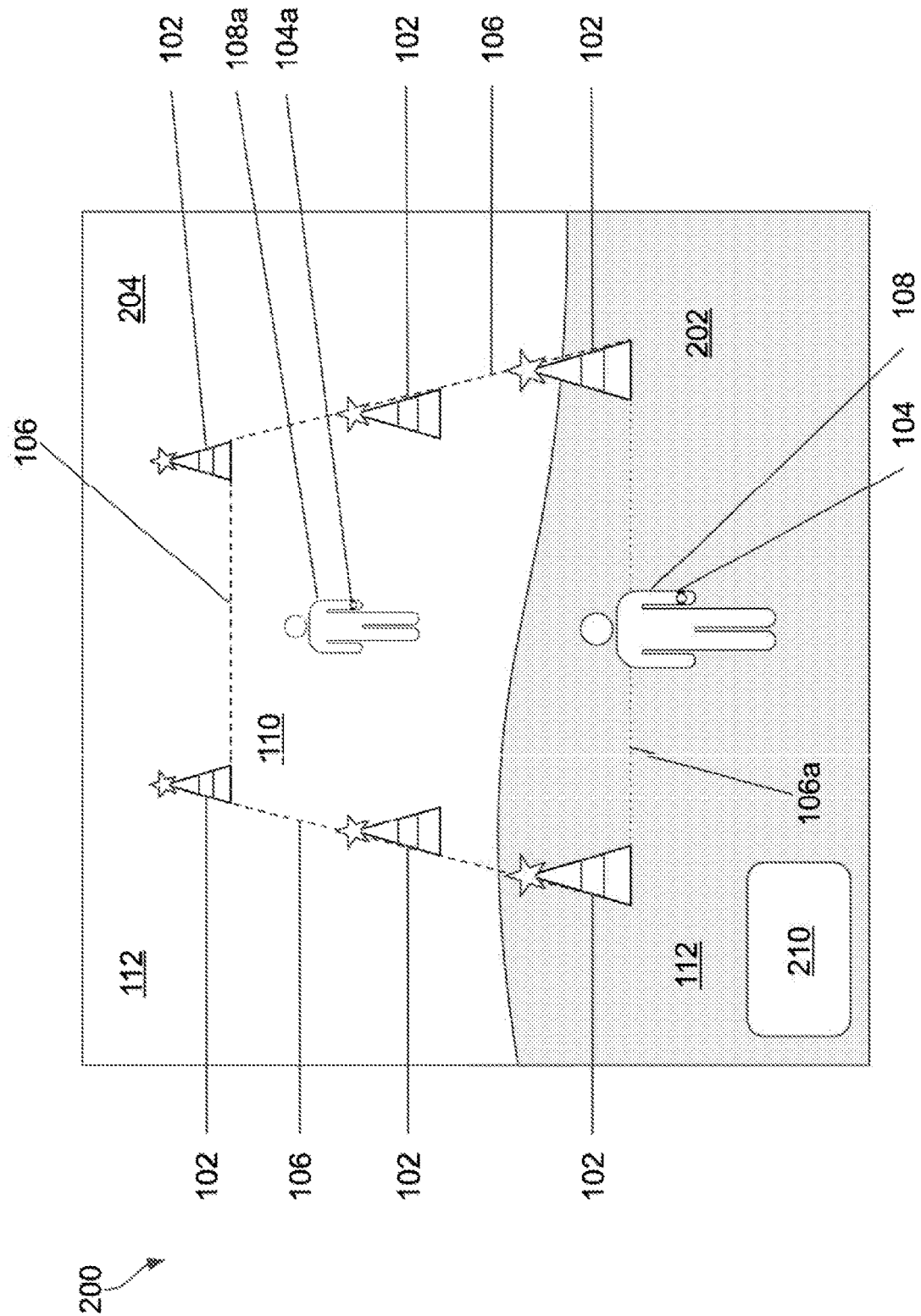
FIG. 2 is a schematic view of a geofencing system of an alternative embodiment.

FIG. 2 shows a geofencing system 200 of a second embodiment. The geofencing system 200 is deployed in a beach area with sand 202 and sea 204. The markers 102 define a geofence 106 defining a region 110 where it is safe to swim, and separating this swimming region 110 from the rest of the beach area 112.

Beach lifeguards use flags to indicate safe swimming/surfing locations. These flags, which are familiar to users 108, could be replaced with markers 102, or equipped with a device 104 as described herein or similar so as to turn them into markers 102, in order to create an automatic geofence 106 when the lifeguard positions the flags. The lifeguards could equip water users 108a, 108 with a device 104a, 104. The system 200 would alert the user 108, 108a every time they moved outside the geofence 106. As the tide moves it is easy for the lifeguards to move the flags which would automatically update the geofence location.

In the embodiment being described, the geofence 106 has two different boundary types 106, 106a. The first boundary type 106 is as for the boundary of the geofence 106 of the first embodiment. If a user 108, 108a wearing a device 104, 104a crosses the boundary 106, an alarm is sounded. In the second embodiment, if a child 10S crosses the boundary 106, a responsible adult's 108 (e.g. a parent) device 104 also sounds the alarm. The child device 108a and adult device 108 are arranged to communicate with each other as well as with the markers 102. In addition, if a child 108a crosses the boundary 106, an alarm is sent to a control station 210 manned by a lifeguard. The alarm signal includes position information of the child device 104a to facilitate location of the child 108.

The skilled person will appreciate that, in alternative or additional embodiments, the alarm may also be raised when the child device 104a comes within a set distance of the boundary 106, prior to crossing it. The boundary 106a of the second boundary type 106a is across the entrance from the beach 202 into the safe swimming area 110 in the example shown. When the child device 104a crosses this boundary 106a, an alert is sent to the parent device 104 as the parent/responsible person may wish to be more vigilant when the child 108a is in the sea 204. No alarm is sounded, however, and no alarm is sent to the control station 210. Information on the number of people in the water may be updated with the control station 210, however.

In alternative or additional embodiments, the geofence 106 may extend along the beach 202 on either side of the entrance from the beach 202 into the safe swimming area 110 so that an alarm can be raised if a user 108, 108a enters the sea 112 elsewhere. In alternative or additional embodiments, the geofence 106 may have boundaries of the second type instead of the first type, or no boundaries, closer to the shore, so that an alarm is only raised if a user 108, 108a is further out.

The markers 102 are arranged to be moved and positioned by the lifeguard. The size and shape of the geofence 106 is therefore controlled so as to keep users safe. An alarm may be raised at the control station 210 if any of the markers 102 are moved by an unauthorised person. In alternative or additional embodiments, the devices 104, 104a may be arranged to raise two or more different alarms—for example a first alarm when a user 108, 108a comes within a preset distance of a boundary 106 so as to provide a warning that the geofence 106 is close, and a second alarm when the user 108, 108a crosses the geofence 106.

In some embodiments, the wearable device 104 is arranged to enter a different mode and/or to perform a different function on approaching or crossing the geofence 106. For example, once the device 104 is within a preset distance of the geofence 106, the device 104 may check for GPS information and/or for updates to the geofence data more frequently, as the chance of a user 108 crossing the geofence 106 is higher. The configuration (i.e. the way that the device 104 behaves) can therefore be changed depending on its interactions with geo-devices such as the markers 102. The input that changes the configuration can be thought of as a "trigger".

Figure 3B:
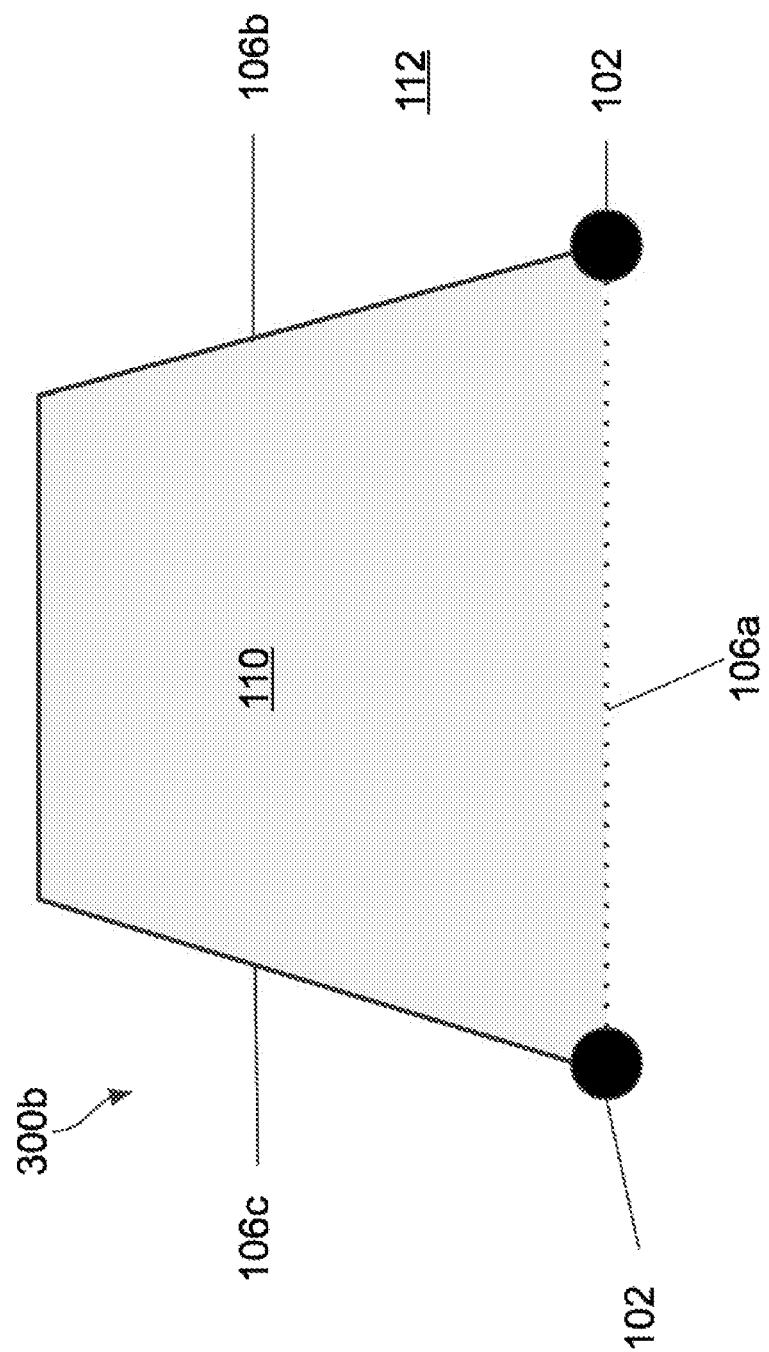

FIGS. 3a to 3d illustrate different ways 300a-300d in which markers 102 can be used to define geofences 106. The markers 102 can be used in isolation (e.g. FIG. 3d) or configured in a pair or group to create automatic geofences 106. FIG. 3a shows a geofence 106 like that shown in FIG. 1; each marker 102 forms a vertex of a polygonal geofence 106, in this case a quadrilateral.

In some cases, it may be preferable to create a geofenced area 110 from two markers; this may have particular utility for a lifeguard in the example of FIG. 2, as placing markers 102 in deep water may not be easy. The lifeguard could position two markers on the shoreline and set a safe distance and direction out to sea so as to define boundaries extending away from the markers 102.

FIG. 3b shows the use of just two markers to define a polygonal geofence. Boundary 106a is formed between the two markers, as for the examples given above. Each marker 102 has a distance and direction associated with it to define boundaries 106b and 106c respectively. The fourth side of the quadrilateral is formed by joining the far ends of boundaries 106b and 106c with a straight line, so as to complete the geofence 106. In the example shown in FIG. 3b, boundary 106a has different properties from the rest of the geofence 106; i.e. the devices 104, 104a act differently and/or the information is processed differently when approaching or crossing boundary 106a as compared to the rest of the geofence 106.

FIG. 3c shows a liner geofence 106 extending between two markers 102. This could be used as a starting or finishing line of a race, for example, or between two walls, for example, so as to form a geofence 106 between two physical barriers.

FIG. 3d shows a linear geofence 106 defined by a single marker 102. The marker 102 has a direction and optionally a distance associated with it so as to define the linear geofence. If no distance is defined, the length may be infinite, limited only by signal and range of the system. In the embodiment being described, the marker 102 has a visible arrow indicating the direction of the geofence 106 such that a user 108 in the vicinity of the marker 108 can see where the geofence 106 is.

Figure 4B:
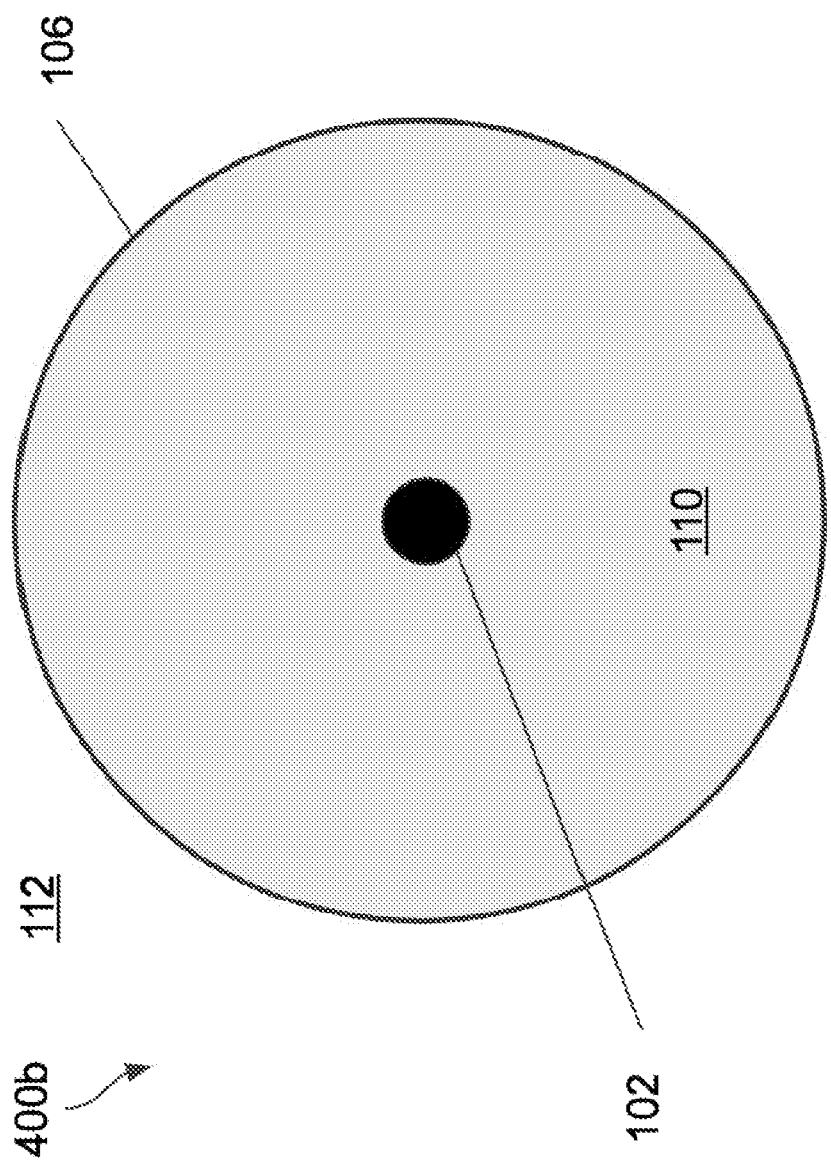
Figure 4C:
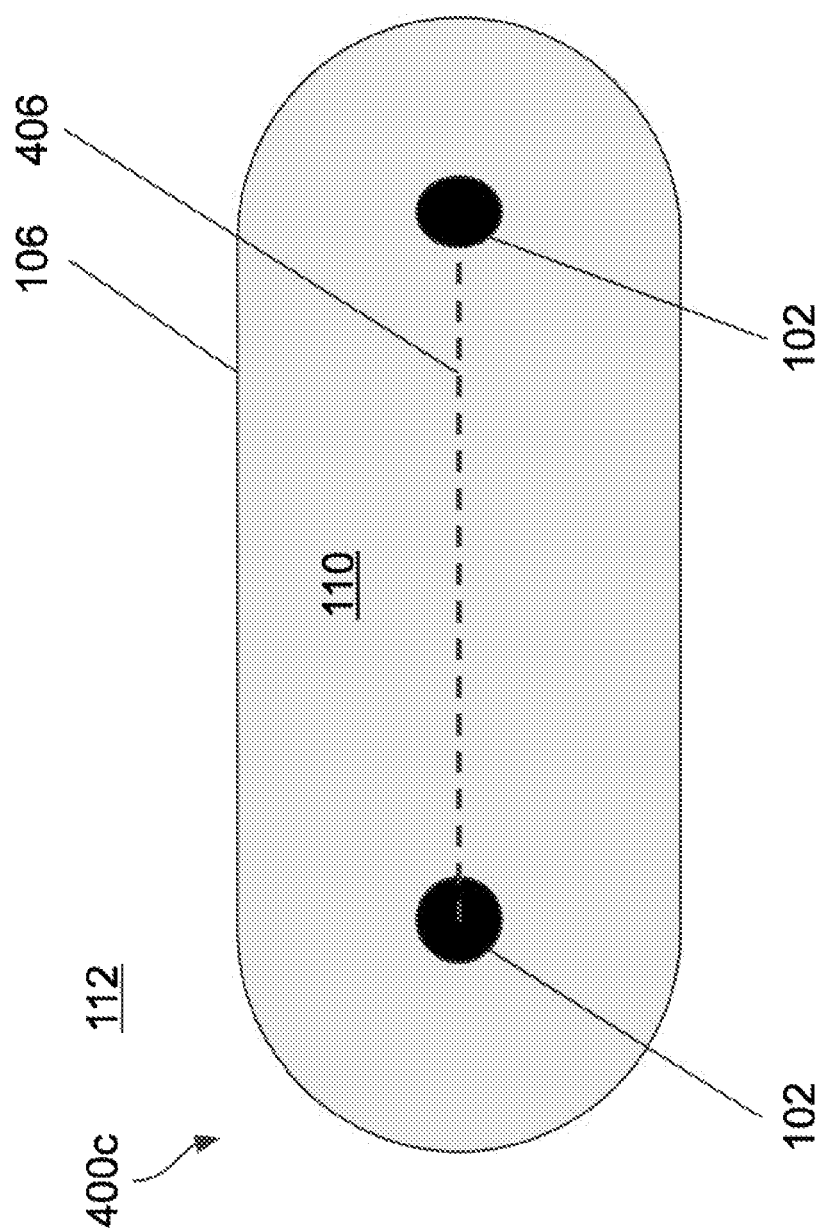

FIGS. 4a to 4c illustrate further different ways 400a-400c in which markers 102 can be used to define geofences 106, in particular, using an offset r. In the example shown in FIG. 4a, three markers 102 are arranged in a triangle 406. Instead of the geofence 106 being formed by the lines 406 between the markers, an offset r is added so that the geofence is located a distance r from the lines 406.

In the embodiment being described, the value of r can be changed by an authorised user 108. The change may be implemented using a device 104 or another access point. The change may be implemented using an app installed on the device 104 or other access point. An access point may be a computer that is able to receive or broadcast data to devices 104. In the embodiments being described, the access points are radio enabled, and, in at least some embodiments, can be connected to the internet for remote access of information. In the embodiment shown, the geofence 106 is curved at the corners; in alternative embodiments, the geofence 106 may have sharp corners. The skilled person will appreciate that the value of r may be able to be adjusted using a device 104, 104a or a control station 210 or the likes. Similarly, the treatment of corners may be adjusted so as to change the shape of the geofence 106 for the same marker location. In some embodiments, r may take a negative value. i.e. being within the triangle 406 such that the geofence 106 is smaller than the triangle 406. This may be done, for example, so that someone leaning over a fence comprising markers 102 does not trigger an alarm, but someone standing on the wrong side of the fence would.

FIG. 4b shows a circular geofence 106 formed by a single marker 102. The distance r forms the radius of the circle. FIG. 4c shows a geofence 106 formed by two markers 102. In this example 400c, the geofence 106 takes the shape of a hippodrome—a rectangle between the two markers 102 with a semicircle centred on each marker 102 extending from each end of the rectangle. The offset r defines the radius of the semicircle and half the width of the rectangle. The skilled person will appreciate that FIGS. 3a-d and 4a-c are simply examples of the different shapes and ways of constructing geofences 106 that can be used, and are not limiting.

In alternative or additional embodiments, drawing tools in an app can be selected to form a line, polygon or offset from various marker locations. In such embodiments, the markers 102 may only provide position information, and any offset, direction or distance information may be input via the app.

Figure 5A:
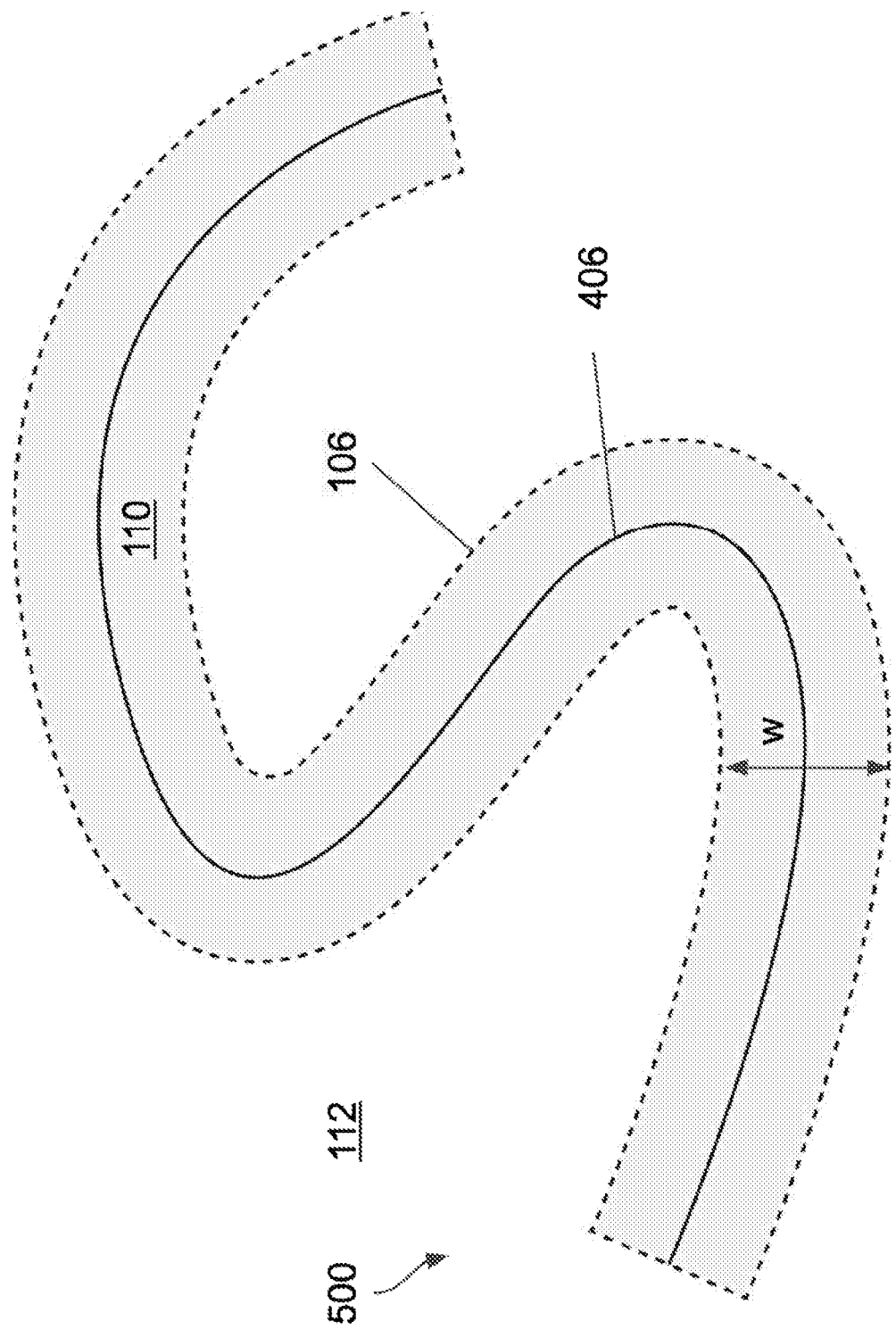
FIGS. 5a and 5b illustrate use of a geofencing system of an embodiment to define a race segment.

Figure 5a illustrates a segment for use in a race. In use, each race participant would wear or carry a device 104. A row of markers (not shown) are arranged along a line 406 and an offset r is selected so as to form a track of width w centred on the line 406. The marker at each end of the line 406 has different properties associated with it such that it forms a straight line end to the track segment.

Figure 5B:
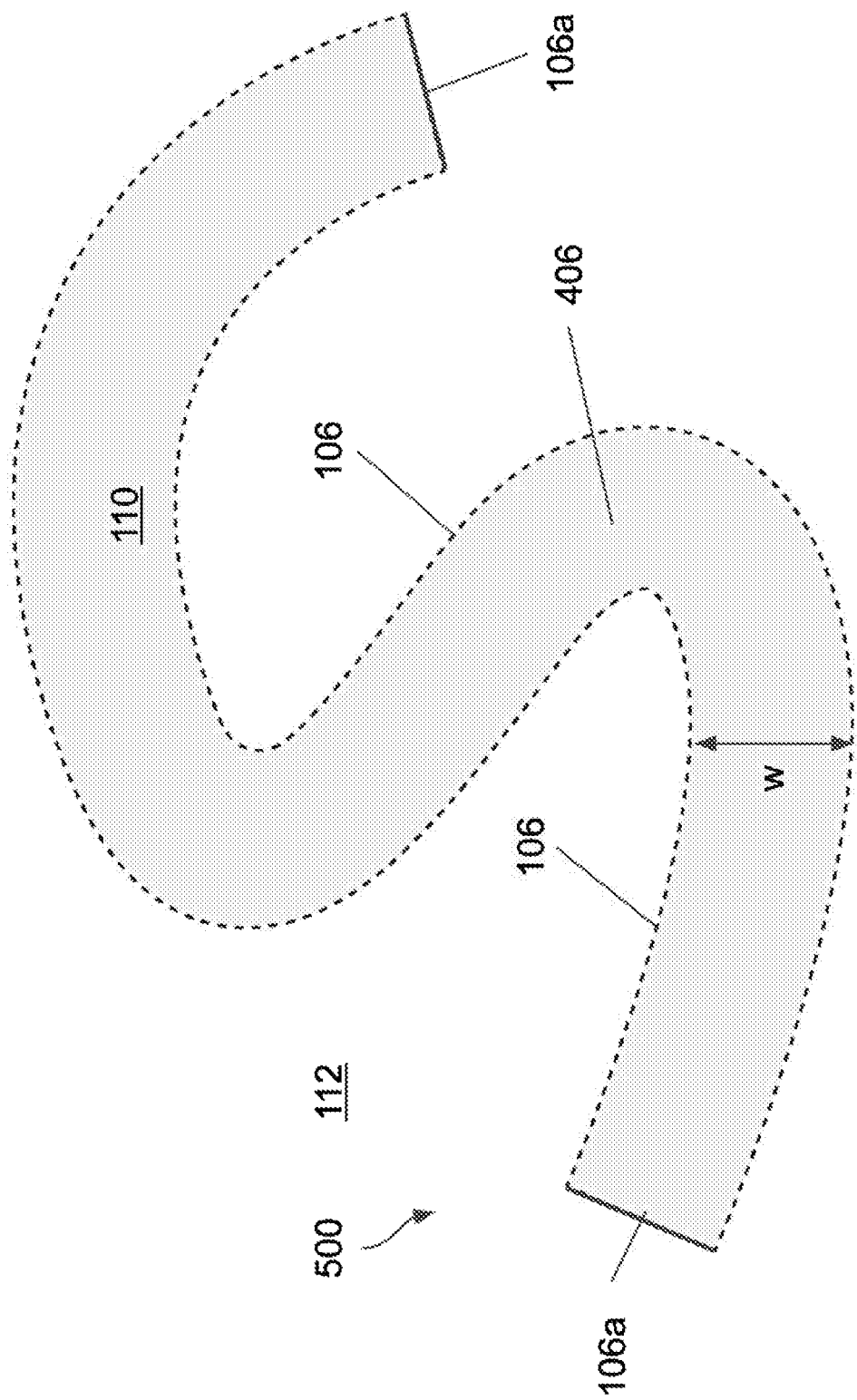

FIG. 5b shows the resultant geofence 106, highlighting that the ends of the track segment 106a have different properties from the boundaries along the length of the track segment. The race participants should not cross the boundaries 106 along the length of the segment as these boundaries define the track. Race participants are expected to cross the boundaries 106a at the ends of the segment. These boundaries may form a start line and finish line of the race, or simply of the segment—statistics for each race participant for each segment may be sent from the devices 104 to a race controller 602 and collated.

Figure 6:
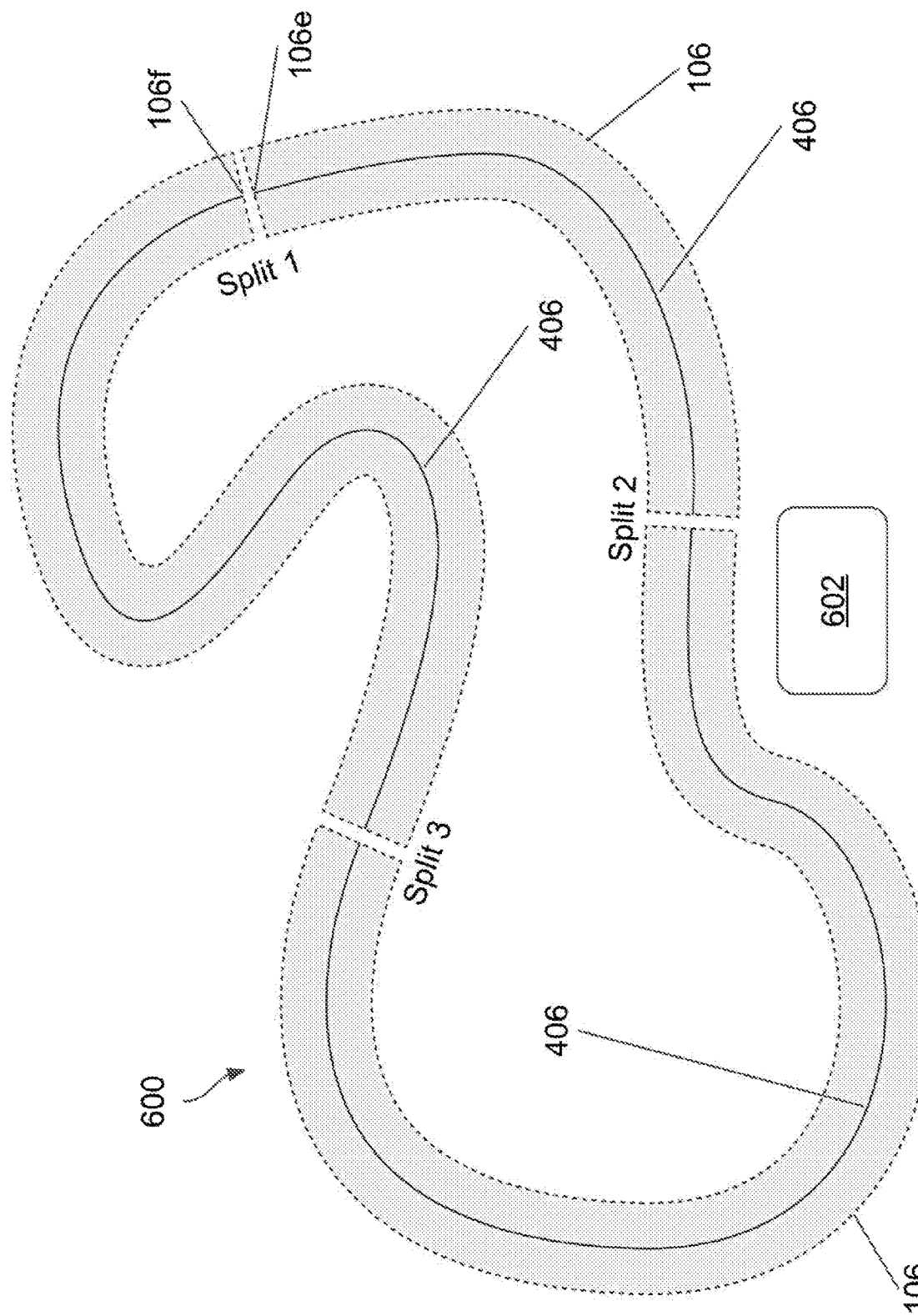
FIG. 6 shows a schematic view of a race track subdivided into multiple race segments as illustrated in FIGS. 5a and 5b.

FIG. 6 shows a complete race track 600, divided into four segments. In the embodiment being described, boundary 106e is the start line and the race entails completing five laps of the track 600. Boundary 106f is the finish line once five laps have been completed. The system keeps track of the number of times each device 104 passes boundary 106f. The device 104 can therefore act as a lap-counter and can provide the user 108 with an indication of his or her progress through the race. The device 104 can inform the user 108 when the final lap is completed.

Each device 104 understands the geofence coordinates and the order in which the athlete should enter and exit each geofenced segment. If the user 108 does not exit and enter the geofences 106 in the correct order for the defined route, the time and route taken may be scrutinised by race officials. The race data can be extracted from the devices 104, for example at set intervals during the race, and optionally shown on screen. It may offer a function of estimating current athlete position on a map based on known athlete speed during the previous segments.

In the embodiments being described, the device 104 has a user interface and can display various pieces of information on request. In the example of a race 600, the device 104 can display a map of the race course with the user's position on the race course, the user's progress through the race, and/or the user's rank with respect to other race participants etc. Collated data may be provided to the device 104 by the race controller 602. Alternatively or additionally, devices 104 may communicate directly, or via a marker 102. Markers 102 may store data such as the number of devices 104 to have passed them and the number of times each device 104 has passed.

Figure 7:
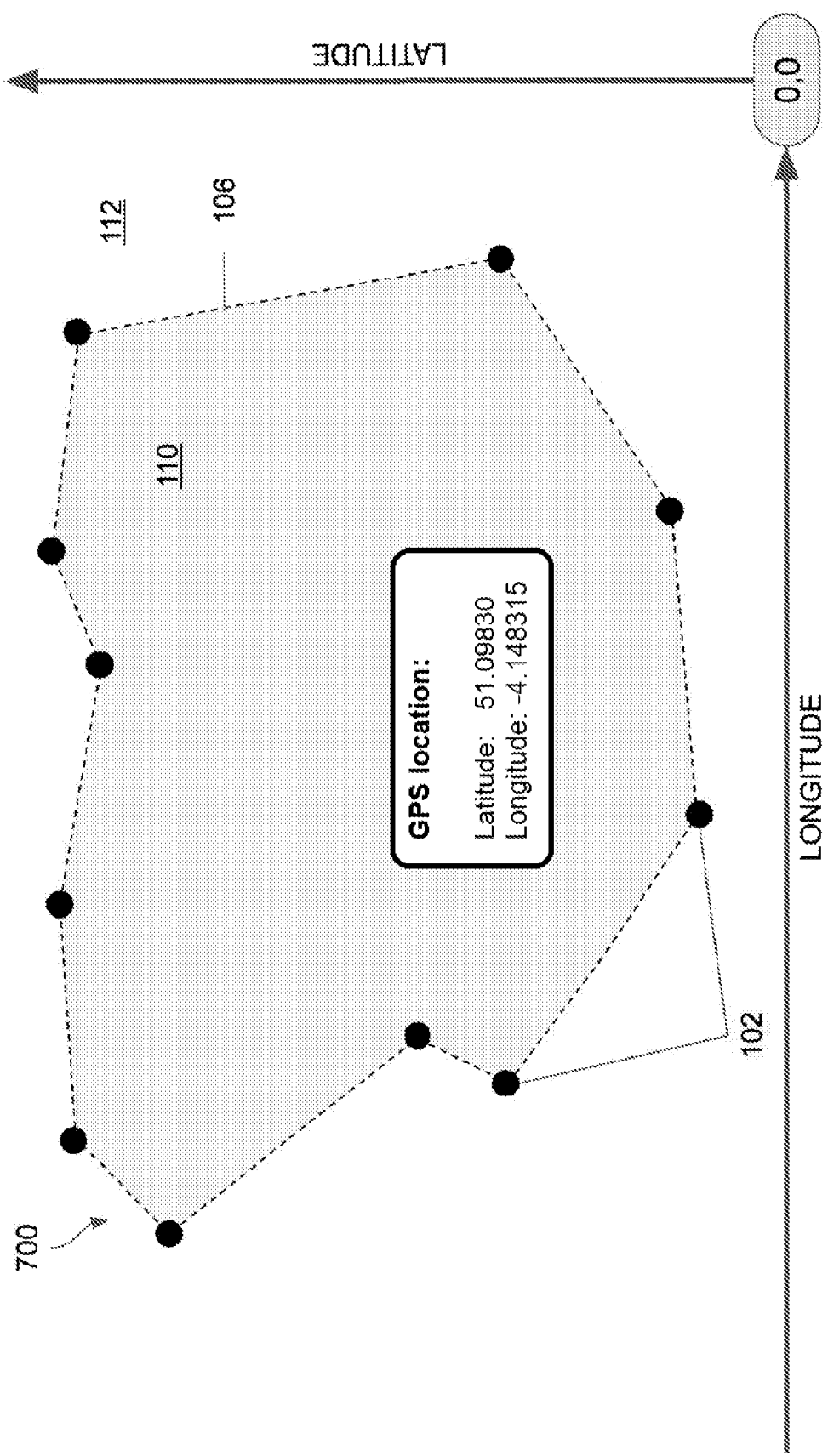
FIG. 7 illustrates a device display of a geofence in line with the invention.

In the example of a geofence 106 covering any area 110, the device 104 may display a map 700 such as that shown in FIG. 7. The map 700 indicates the position of each marker 102 (marked as circles), the GPS location of the user and the shape of the geofence. The coordinates of each marker 102 (e.g. latitude and longitude) are updated regularly and used to determine a polygonal geofence 106 (in this embodiment) which is saves to the device's 104 memory. In some embodiments, the geofence 106 may be shown overlaid on a map. In alternative or additional embodiments, the display may be provided on a tablet, laptop or desk-top computer, or the likes connected to the system 100.

Figure 8:
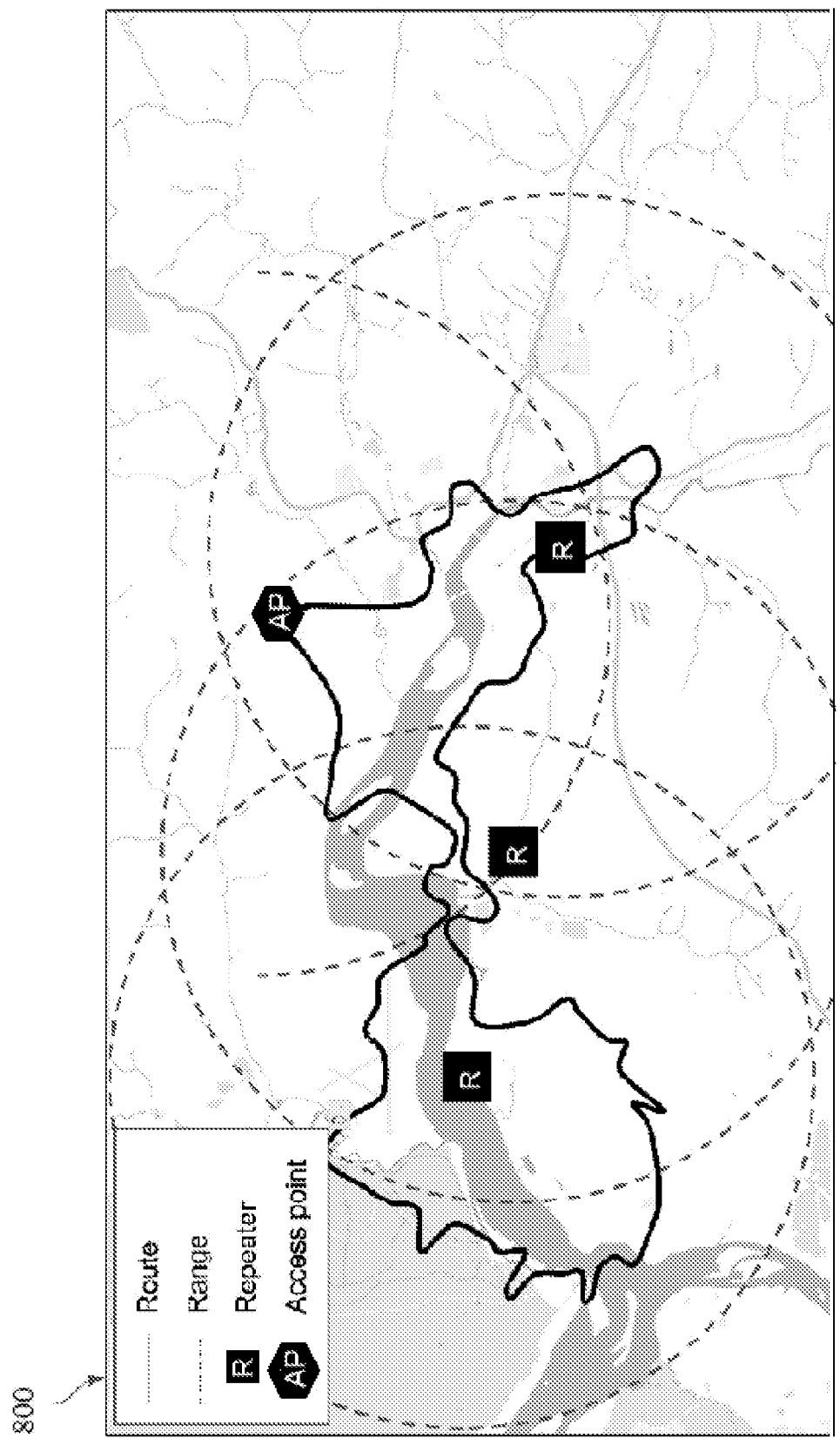
FIG. 8 shows a device display of a map illustrating a geofenced route and range capabilities.

In the embodiment shown in FIG. 8, the route line is a geofence 106 of the type shown in FIG. 6. FIG. 8 shows a map with a geofence 106 along the path to be followed. The route may be for a cross-country race, an electronically guided walk or the likes. When the route is displayed on a map shown on the display of a device 104 or associated computer or the likes, the graphic representation of the route may be shown as a single, relatively thin line 406, but the geofence calculations would include the offset/tolerance width w discussed above.

An access point (hexagon labelled AP) is provided. This may be managed by a race controller or visitor centre employee or the likes. The access point can be used to define or change the width w of the geofenced area 110, to check that no markers 102 have been moved, to visually display the route, or the likes. As the route 106 covers a relatively large area, repeaters (squares labelled R) are used to allow the access point to communicate with even the remote markers 102, and with any devices 104 within the range (marked by shaded circles) of the repeaters. In alternative or additional embodiments, the markers 102 and/or the devices 104 may act as repeaters.

Triggers

Movement of a marker 102 can be thought of as a trigger event—moving the marker 102 causes a change in the shape and/or location of the geofence 106, potentially triggering changes to the functionality of the device and/or to the geofence itself. In the case of moving a marker 102, this leads to updates to the geofence data and hence to the checks performed by or for the devices 104.

Triggers, or trigger events, are occurrences which change the configuration of at least one of the geofence 106 and the device 104. In some embodiments, a trigger event creates or changes a geofence 106. Movement of a marker 102 is only one type of trigger event, however. Other examples of trigger events include:

(i) a message received from one of the markers 102, e.g. changing the direction or distance associated with a marker, turning a marker off, or introducing a new marker;

(ii) a message received from another wearable device 104a, e.g. causing the wearable device 104a to function as a marker 102, changing the offset distance r, or an emergency signal broadcasting the user's 108a location;

(iii) a message received from a central server;

(iv) the wearable device 104 crossing the geofence 106;

(v) the wearable device 104 coming within a set distance of the geofence 106; and (vi) a condition sensed by the wearable device 104.

Triggers can therefore be geo-location based or can be activated by an input on the device 104 and then related to a geofence 106 (such as changing offset r). Interaction with a geofence 106 can therefore be considered as one of the triggers which change how the device 104 operates. As well as or instead of raising an alarm when a geofence 106 is crossed, a device 104 may enter a different mode such that its behaviour is different when it is outside of the geofence 106 as compared to inside. e.g. broadcasting location more or less frequently.

In some embodiments, at least one of the markers 102 has sensing capabilities, for example the capability to detect wind (direction, speed, etc.), certain gases, e.g. $O_2$, $N_2$, CO, $CO_2$, smoke, pressure, and/or temperature. The or each marker 102 with sensing capabilities can be arranged to create or change the geofence 106 based on sensed conditions. Any known sensors may be used.

For example, a marker 102 with temperature and smoke sensing capabilities may be used as part of a fire alarm system. If smoke or an elevated temperature is used, a light associated with or forming part of the marker 102 may be illuminated and a geofence 106 formed around the affected area (i.e. the marker 102 is turned on and starts functioning as a marker). The marker 102 may transmit its position information, and optionally the sensor data, to other markers 102 in the vicinity so as to establish a perimeter around the affected area. The markers 102 may transmit their information, optionally including sensor data, to a central control processor. The markers 102 or the central control processor may transmit alerts to users 108 with wearable devices 104 and may identify any users 108 within the affected area and provide their position information to the central control and/or to emergency services or the likes.

Similarly, markers 102 forming part of a perimeter on a ski piste may sense high winds and alert users to potential danger. A value of an offset r may be increased when wind strength increases to keep users 108 further from a danger area. The geofence 106 can therefore be moved (or created) without moving the markers 102. Triggers can therefore create or cause changes in the geofence 106. In various embodiments, a geofence 106 is created based on a trigger, for example by activating markers 102 based on sensor data.

Triggers can also cause changes in device 104 configuration without changing the geofence 106. In some embodiments, relative position of the device 104 and the geofence 106 can alter the behaviour of the device 104. For example, physical markers in a race can be used to determine intervals during the race (see FIG. 6), this may be a Start/Finish line, a changeover section in a Triathlon or a buoy used as a way-marker in a swimming race. The geofencing system uses these real world markers 102 to define a geofence 106 trigger a change in configuration of the device 104, such as in the following ways:

entering a geofence 106e by crossing a start line defined by one or more markers 102 could activate a Bluetooth module so that precise data can be collected;

crossing a geofence 106a at a change-over between race segments may indicate that a polling frequency for GPS and Radio should be increased to allow more accurate statistics to be gathered, or to monitor a swimming section of a triathlon more closely, for example, due to the increased safety risks.

These two examples can be thought of as geolocation triggers: a module is activated on crossing a start line, and GPS polling is increased when a user 108 enters a swim zone. Similarly, in other applications such as firefighting or search and rescue, the behaviour of the wearable device 104 is arranged to change in response to feedback from either a marker 102 or a geosensor arranged to communicate with the system. This example can be thought of as an onboard sensor trigger: a firefighter's device 104 detects dangerous gas and broadcasts data to colleagues within range. The configuration of a device 104 can therefore be changed depending on its interactions with geo-devices, be they markers 102, other devices 104a or geosensors. All inputs that change the configuration can be referred to as "triggers".

Communications

FIGS. 9a to 15 illustrate various communication diagrams for use with systems 100, 200 in accordance with the invention. Each device 104 is capable of recording and broadcasting information captured by on-board sensors in "real-time". In the embodiment being described, the device 104 uses a radio protocol, and more specifically an adaptation of LoRa Radio protocol. The skilled person will appreciate that other communications protocols can be used.

In many embodiments, the primary function of the device 104 is to improve safety for the user by connecting them to a network of safety professionals. In additional or alternative embodiments, the device 104 is used in sporting events to broadcast information about athletes to race control or the commentary box to enhance the participant and spectator experiences.

In the embodiments being described, the device 104 has been developed so that it can be attached to people or objects. In the examples shown in FIGS. 2 and 3, the device 104 is designed to be worn on the wrist of a user 108. However, the device 104 can be fixed to equipment or worn or carried by a user 108 in many ways. The device 104 can be used as a standalone system or as part of a wider network. A device 104 can act as a marker 102, i.e. can be arranged to be clearly visible and to define a geofence 106, or a part of a geofence 106. The device 104 can be used in various different communication styles and networks, including the following:

User Formed Network (UFN)

Figure 9A:
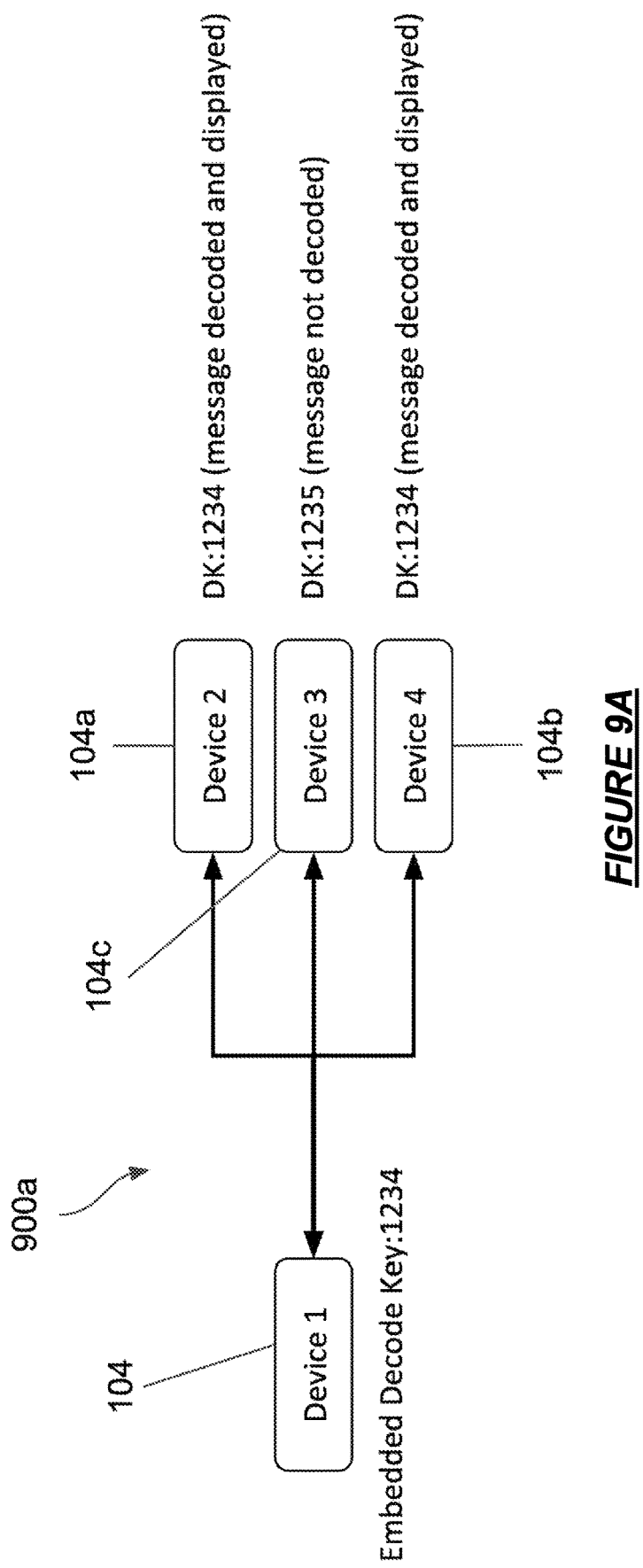
FIG. 9a shows a communication diagram of communication between devices in some embodiments.

A number of devices 104-104c can be directly connected together (without the need for an access point); this is called a user formed network 900a as shown in FIG. 9a. Each device 104-104c can broadcast and receive messages from one or more of the devices inside its network depending on scenario. There is no need for a connection to the internet or a cellular service, although communications can be via the internet or a cellular service in some embodiments.

A known issue with radio communications is that all radio devices operating on the same frequency will receive all broadcasted messages causing potential privacy issues. In order to overcome this issue, all paired devices 104, 104a, 104b are given the same encryption key on configuration. In the embodiment being described, this key is required to understand the message; if the message is not understood by the device it is not displayed. In FIG. 9a, Device 3 104c receives the message from Device 1 104 but does not have the right key so cannot decode it. Devices 2 and 4 (104a and 104b) do have the correct key so can decode the received message.

Figure 9B:
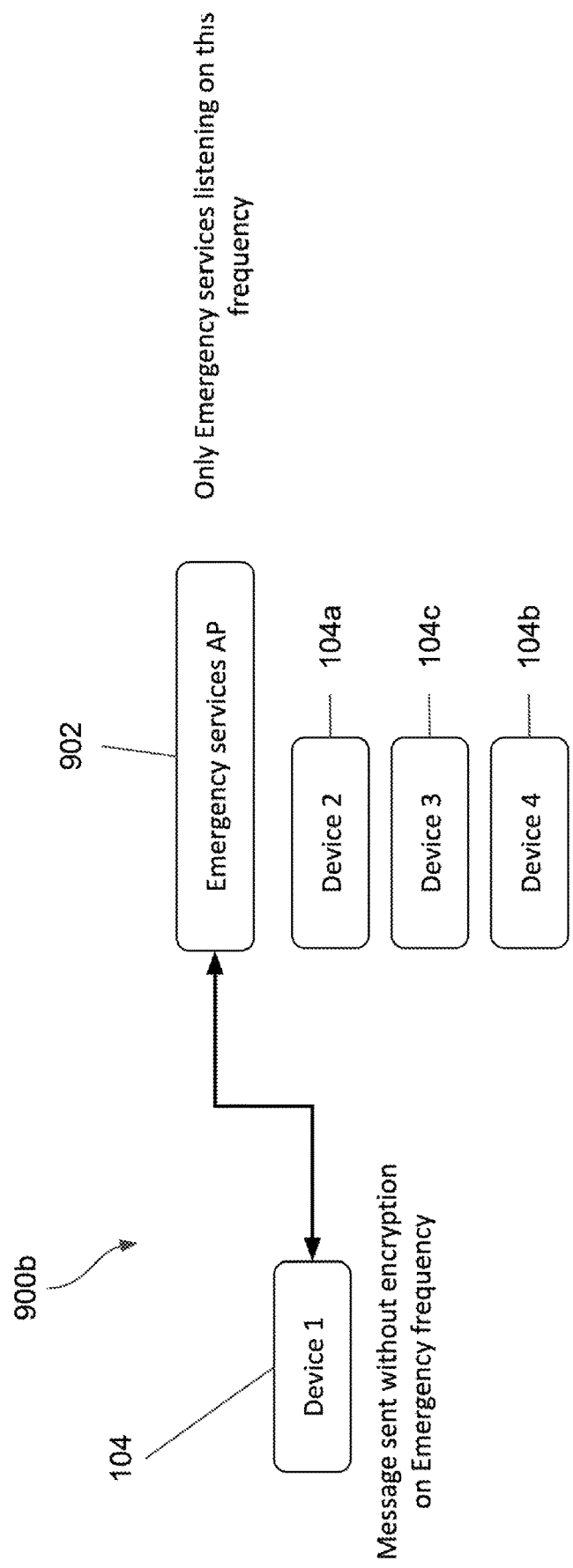
Figure 10A:
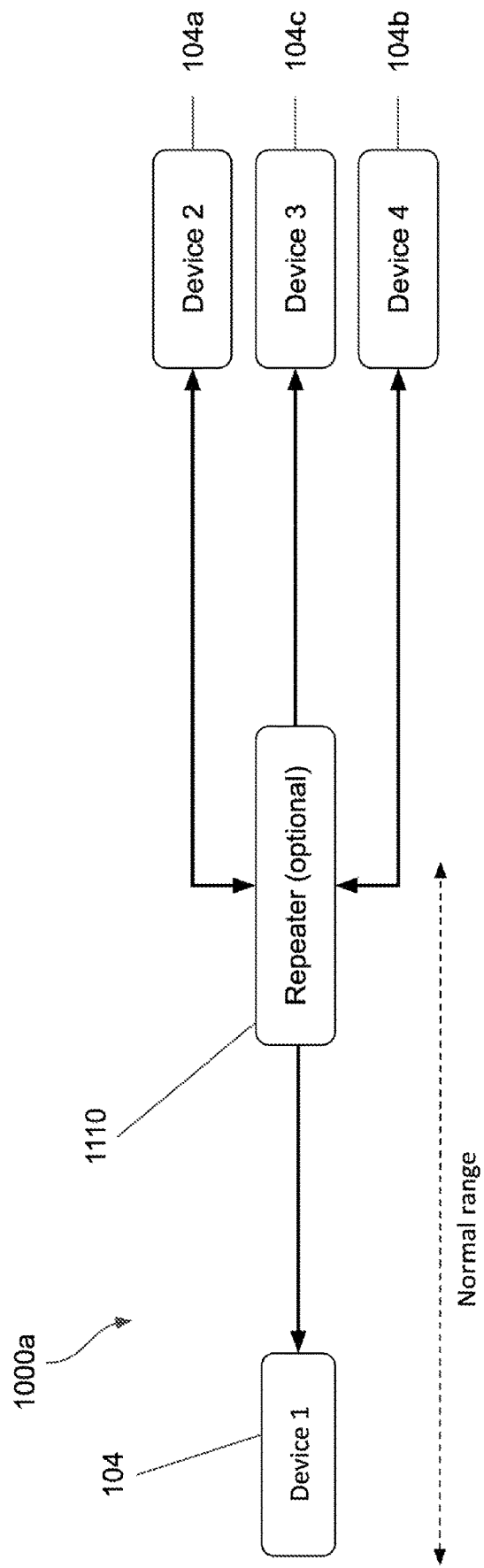
FIG. 10a shows a communication diagram of communication between devices used in some embodiments using a repeater.
Figure 10B:
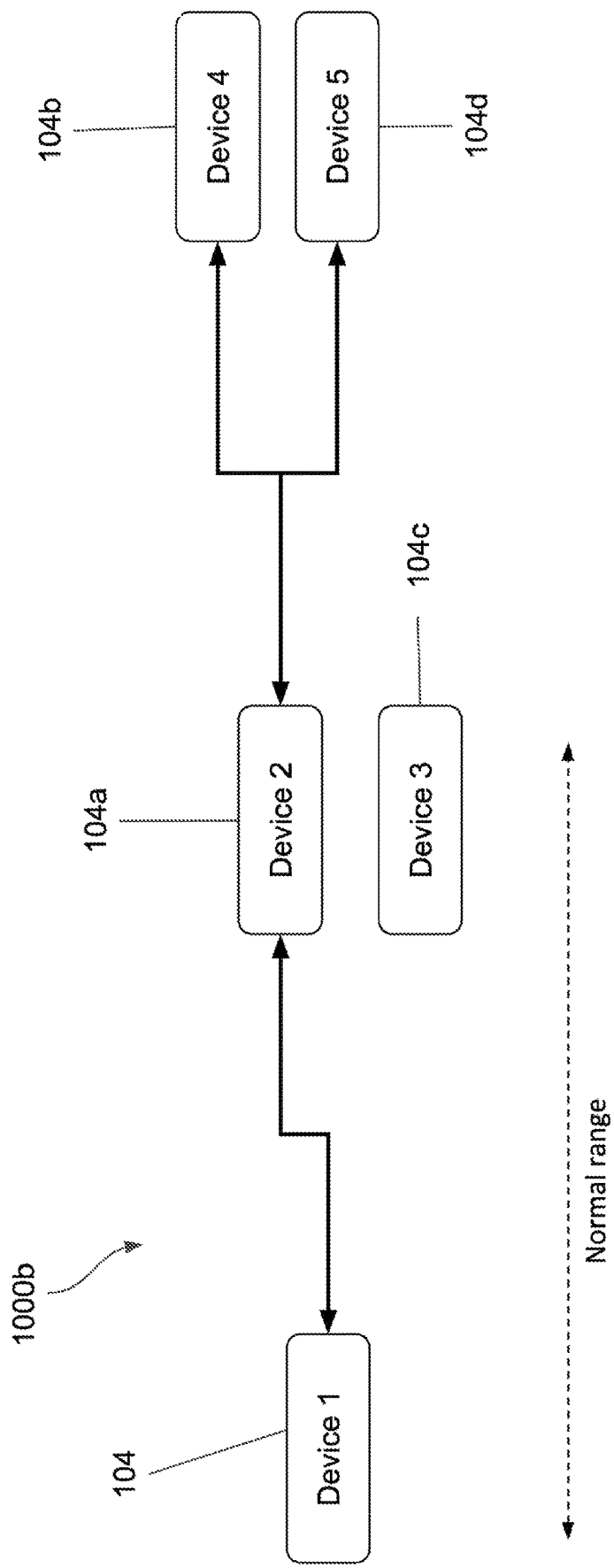
FIG. 10b shows a communication diagram of communication between devices used in some embodiments using one of the devices as a repeater.

It is possible for UFN devices to also exist simultaneously on a Centrally Controlled Network. The most common use case for this is mountain rescue or lifeguarding where devices 104-104c are used by members of the public to track each other within a UFN, but where the users may require assistance external to the UFN in the case of emergency. The network 900b shown in FIG. 9b illustrates this—as well as Device 1 being able to communicate with Devices 2 to 4 (subject to key authorisation). Device 1 104 can also communicate with an emergency services access point 902. In the embodiment being described, a different frequency is used for communication with the emergency services access point 902 as compared to communication with the other devices 104a-c.

It is possible to use signal repeaters 1110 (see FIG. 10a) or for devices 104 to connect together (see FIG. 10b) to form a mesh network 1000a, 1000b. A mesh network 1000a, 1000b is a network topology in which each node relays data for the network. Meshed devices 104 can forward broadcasts through other compatible devices (including repeaters 1110), extending the range of the network 1000a, 1000b. The skilled person will appreciate that devices used in, and/or forming, mesh networks therefore do not necessarily have geofencing capabilities.

In the case of a meshed network using a device 104a as a repeater, the device 104a does not need to understand the message in order to forward it—it is therefore immaterial whether or not Device 2 has the correct encryption key for the message sent by Device 1. Data can be downloaded from all UFN devices 104-104c, for example via Bluetooth or via an access point.

Example use case 1: A number of devices can be used for connecting a group of skiers. Skiers can use the onboard display to track the location of other members in their group. It is possible for any member of the group to alert the emergency services after injury or an avalanche or the likes via the Centrally Controlled Network of the ski resort.

Example use case 2: A method of connecting the crew of a yacht. It is possible to alert the attention of all crew if one member falls overboard and exits the geofence 106 formed by a radius of one or more members (the device 104 of one or more members may act as a marker 102).

Figure 11:
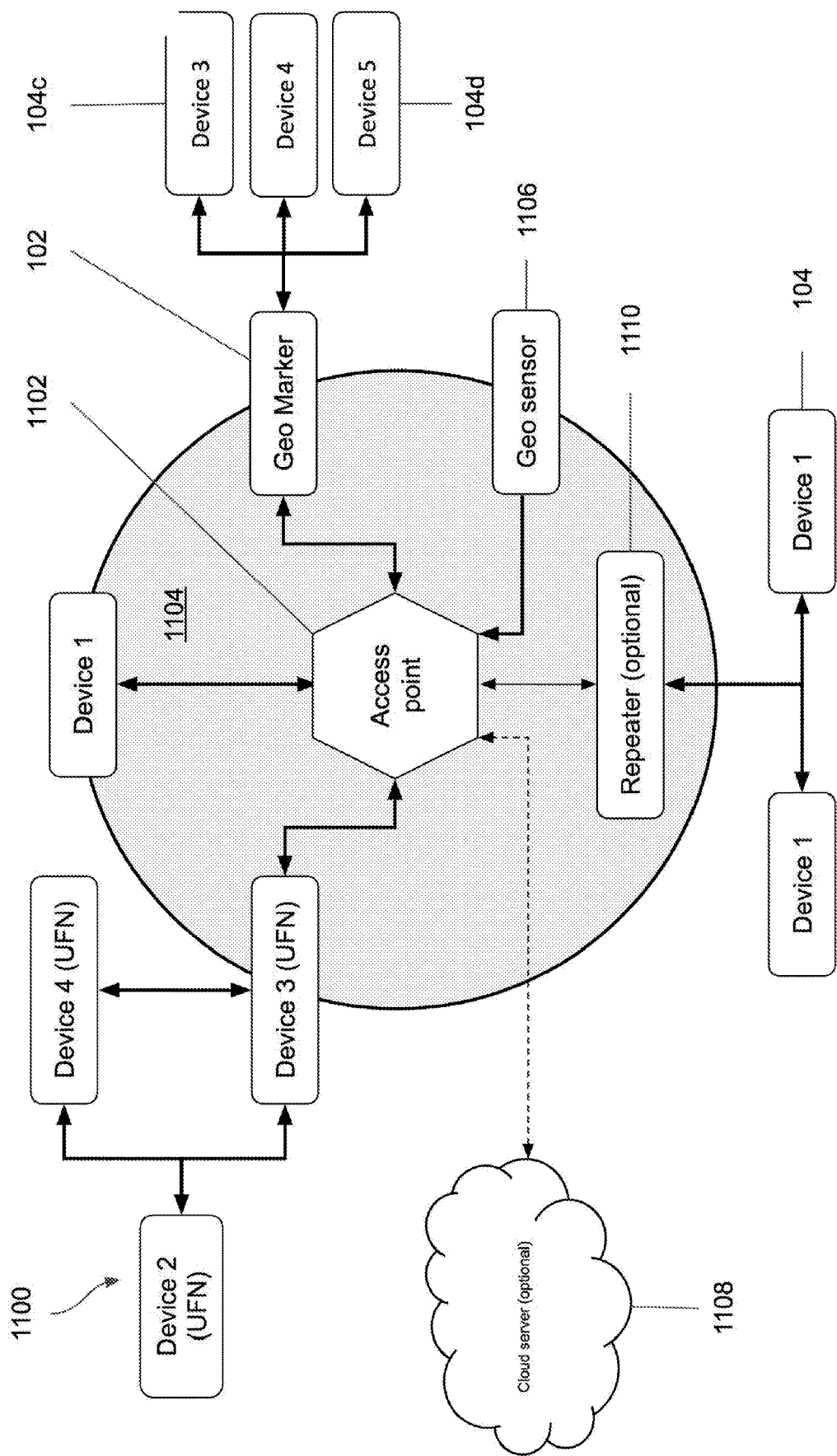
FIG. 11 shows a communications diagram for a geofencing system of an embodiment.

Centrally Controlled Network (CCN) 1100:

As shown in FIG. 11, a number of devices 104 can be connected to an access point 1102 either directly or through a network comprising one or more repeaters (e.g. satellite repeaters), other devices 104a-d and/or markers 102.

Devices 104 in a CCN 1100 have the ability to repeat messages and act as a mesh network in order to extend network coverage. If a group of the devices 104 are moved too far away from an access point 1102, repeater, or other device 104 in contact with an access point or repeater, the connection to the CCN 1100 is lost and a separate UFN may be formed between the group. This UFN may become a part of the CCN again once one of its member devices moves within range of a repeater, access point, or connected wearable device. In the embodiments being described, data sent from devices 104 is saved on the access point 1102 in database format and can be backed up to an internet server 1108 in order to be remotely accessible. This information can be graphically displayed locally or remotely through a web-app if wished.

Figure 12:
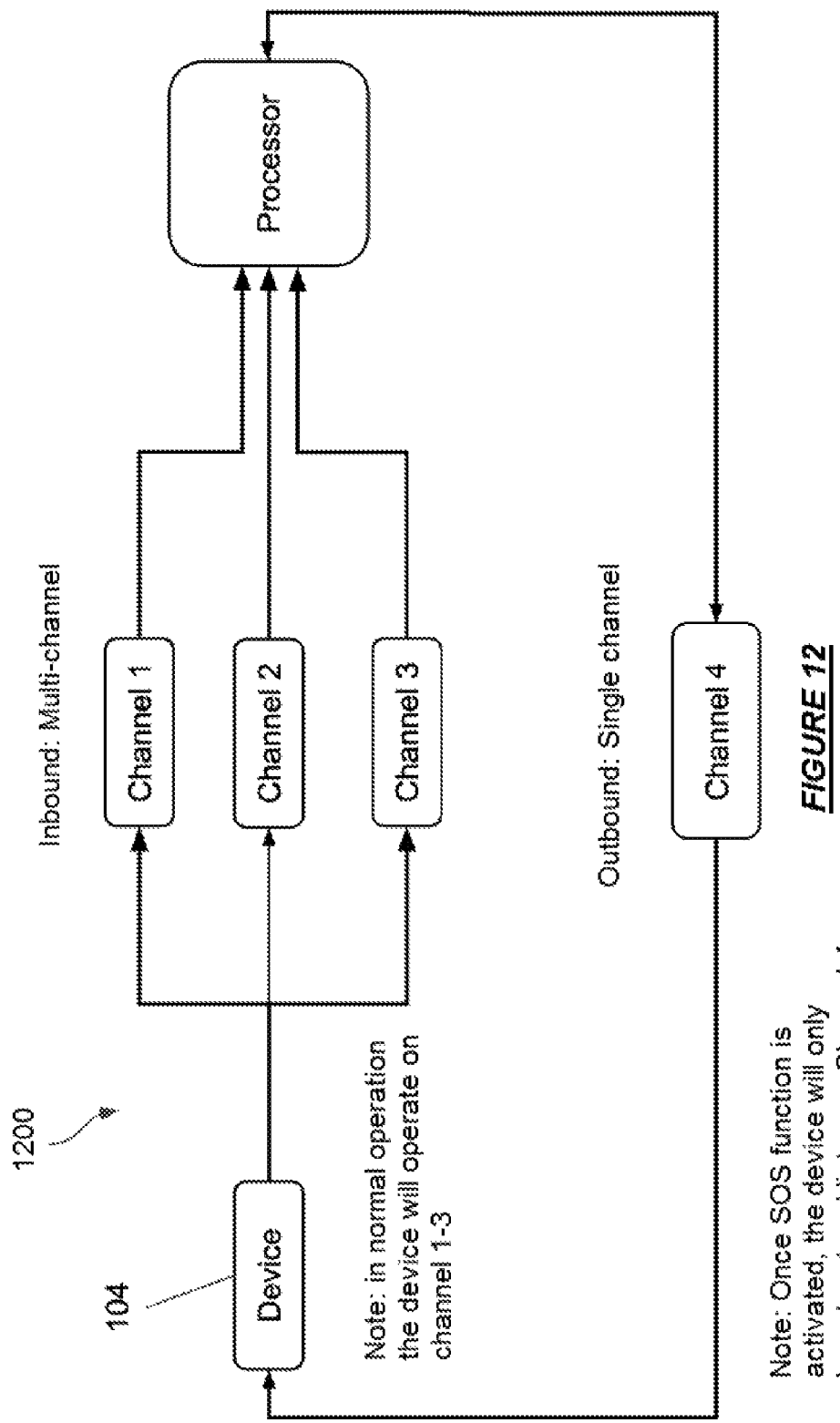
FIG. 12 shows a communications diagram for a device forming part of a geofencing system of an embodiment.

Networks. e.g. CCNs 1100, of various embodiments are capable of handling more than one channel simultaneously, as shown in FIG. 12 (Channels 1 to 4). The skilled person will appreciate that the ability to handle multiple channels can facilitate expansion of network capability, particularly when the airwaves are saturated due to a large number of users 108.

FIG. 12 shows a general communication method for a multi-channel system whereby messages are sent over a series of channels (Channels 1 to 3) to reduce message collision and the system listens for configurations or a "heartbeat" on a reserved channel (Channel 4). The "heartbeat" is a message sent from a device 104 to an access point, marker 102 or the likes in some embodiments, in order to confirm that the device 104 is functioning correctly and is within range of the network. The skilled person will appreciate that this kind of message may be sent regularly (e.g. at a set frequency) or irregularly (e.g. on demand) depending on the embodiment. In the embodiment shown in FIG. 12, which is a communication channel diagram 1200, the device 104 normally operates on Channels 1 to 3 and reserves one channel (Channel 4) as an emergency channel to ensure that SOS messages are received and broadcast quickly and without disturbance. In various embodiments, a CCN Administrator can manually set up geofences 106 within an application. In the embodiments described above with respect to FIGS. 1 to 6, the markers 102 are in place and the application can be used to activate or turn off markers 102 and/or to set an offset r and how that offset is treated. In alternative or additional embodiments, a geofence 106 can be created by drawing a line on a map and/or by placing virtual markers on a map, without the use of "real" markers 102. For example, as an alternative to placing markers 102 to create the geofence 106 shown in FIG. 6, the race route (a single line) may be drawn or imputed via a Keyhole Mark-up Language (KML) file or the likes. This route is then offset (width w) to create a tolerance for GNSS accuracy and route width (road/track width). Once the offset has been created it is possible to turn the outer boundary of this tolerance into a geofence 106. Once a geofence 106 is set up, an event can be triggered when a user 108 passes into or out of the geofenced region 110. Similarly, in some embodiments, such as marking of a ski piste, a danger area may be marked by a clearly visible rope perimeter or a series of poles. The perimeter can be inputted accurately into the system 100, 200 as a geofence 106 by tracing the perimeter in the real world with a device 104 as an official walks around the area, recording the location of his or her device as he or she does so. During normal operation the poles do not have any intelligence (i.e. are not geomarkers as described herein) but signify the real-world location of the geofence 106. Moving the poles will not directly affect the geofence 106 in this embodiment.

In the embodiment being described, the CCN 1100 is capable of managing markers 102 and geo-sensors 1106, which may or may not be associated with a marker 102. In the embodiment being described, markers 102 are able to store data and to repeat messages, making them particularly useful when using the system in event timing (for example, in FIG. 8, the repeaters may be markers 102, and/or markers 102 along the route may additionally act as repeaters to improve signal strength and/or range).

In the embodiment being described, devices 104 that are out of range of the CCN 1100 can record data on-board and broadcast this stored data when they reconnect to the network (either directly via an access point 1120 or indirectly by the UFN). The skilled person will appreciate that a UFN (the mesh network formed by the plurality of devices 104) and CCN 1100 can therefore act as a single network for message handling, whether or not geofencing is involved—the UFN may be thought of as forming an extension of the CCN 1100. In some embodiments, the devices 104 used in such a network may not have geofencing capabilities, and/or may not be configured to perform any geofencing-related activities.

Figure 14:
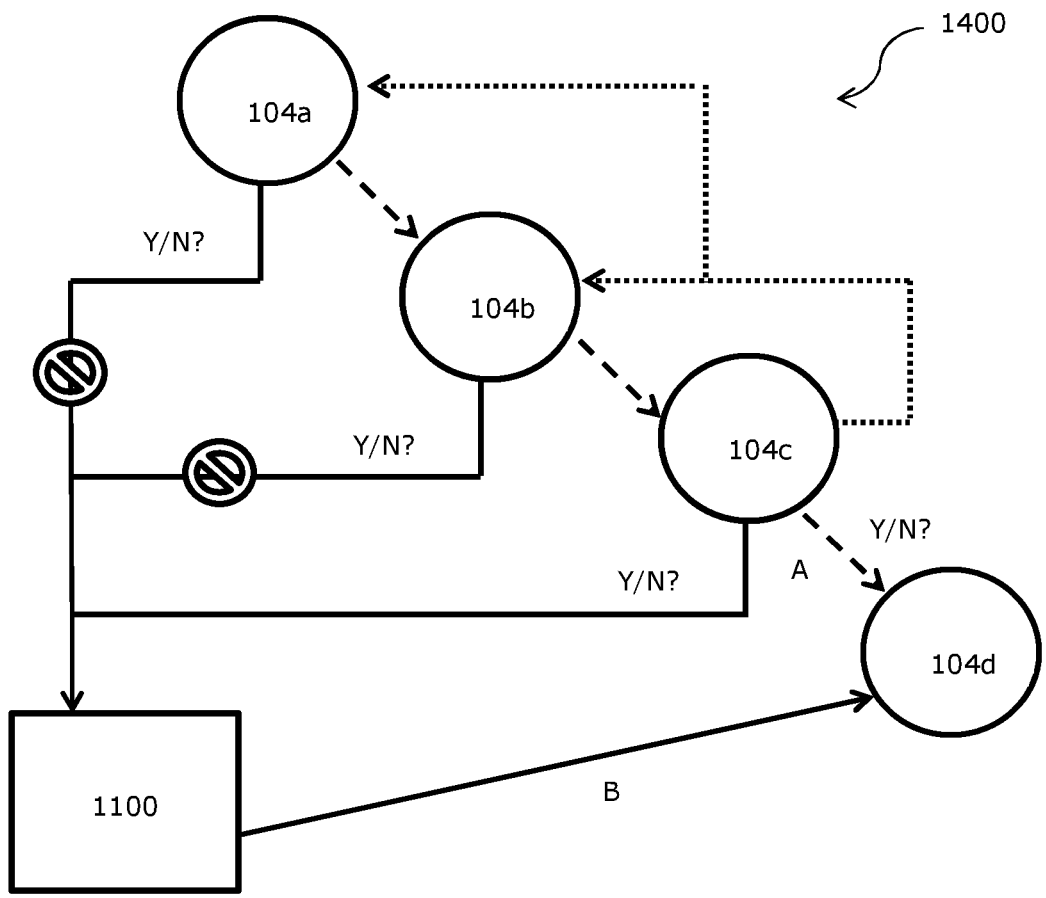
FIGS. 14 and 15 show schematic illustrations of communications between a user-formed mesh network and a centrally controlled network using embodiments.
Figure 15:
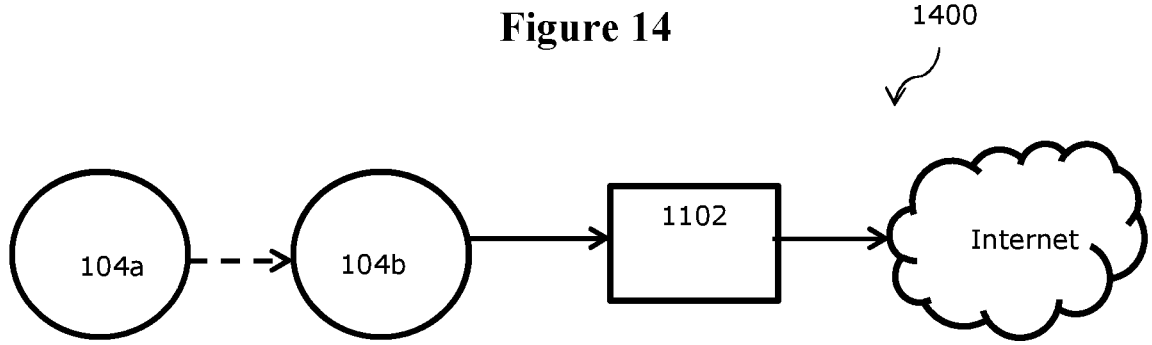

FIGS. 14 and 15 illustrate communications in a combined UFN/CCN system 1400. In these figures, solid lines represent CCN communications and broken lines illustrate UFN communications. Of the UFN communications, dashed lines illustrate a message sent between wearable devices 104a (for the example of FIG. 15, an alert signal being sent out from a first wearable device 104a at or for which the alert is initiated and relayed via other wearable devices), dotted lines illustrate an optional response being returned to the first device 104a, e.g. authentication of successful access point contact.

In the embodiment shown in FIG. 14, an alert is initiated at the first wearable device 104a. The first wearable device 104a attempts to send a signal corresponding to the alert to the centrally controlled network 1100 (via an access point 1102). If the first wearable device 104a is able to send the signal directly to the CCN 1100, it does so automatically. If it cannot, the first wearable device 104a automatically sends the signal to a second wearable device 104b.

The second wearable device 104b attempts to send a signal corresponding to the alert to the centrally controlled network 1100. If the second wearable device 104b is able to send the signal directly to the CCN 1100, it does so. If it cannot, the second wearable device 104b sends the signal to a third wearable device 104c.

The third wearable device 104c attempts to send a signal corresponding to the alert to the centrally controlled network 1100. If the third wearable device 104c is able to send the signal directly to the CCN 1100, it does so. If it cannot, the third wearable device 104c sends the signal to a fourth wearable device 104d, and so on until all wearable devices 104 have been contacted. If no wearable device 104 is able to connect to the CCN, attempts are repeated. One or more users may be provided with prompts to move to a location where a connection to the access point 1102 should be available (e.g. an audible and/or visual message and a map or direction arrow or the likes).

In the embodiment shown in FIG. 14, the first and second devices 104a,b are not able to contact the access point 1102, but the third device 104c is. Once the third device 104c has received confirmation that the signal has been delivered, a message is sent back to the first device 104a confirming this, and optionally providing information on the chain used to reach the access point.

In the example shown in FIG. 14, a modified version of the signal is passed onto the fourth device 104d despite successful delivery to the access point already having occurred (the "yes" option for Arrow A). In the embodiment being described, the wearable devices 104 are configured to alert all users as well as a remote source of assistance; if the fourth device 104d cannot be contacted via the UFN, for example due to being out of range (the "no" option for Arrow A), the system 1400 is configured to cause the access point 1102 to contact the fourth wearable device 104d directly to pass on the alert. In alternative or additional embodiments, the system 1400 is configures to contact a certain minimum number of users in response to the alert, and/or to attempt to get a particular user or a user with a particular ability or qualification to respond. The alert may have built in intelligence to identify the type or number of responders needed; for example based on the type of trigger event that initiated it, the location of the first wearable device 104a, and/or user input. If such a user/potential responder is out of range of the UFN of which the first wearable device 104a is a part, the message can be relayed via the access point (as shown by arrow B in FIG. 15), and in some other cases via e.g. the internet front the first access point to a remote access point and then to that user optionally via a second UFN around the remote access point. Messages can therefore be routed through the CCN, including through one or more UFN extensions thereto, to reach one or more particular wearable devices 104d/one or more specific users. In alternative embodiments, the relaying of the signal may terminate after successful sending to the CCN.

The modified version of the signal may be arranged to inform a user of the fourth wearable device 104d of what has happened—optionally either requesting first-responder assistance or advising the user to stay away/avoid the location of the first wearable device for safety. The modifications to the signal may be made automatically—for example based on known qualities of the fourth user (such as first aid training) and/or on data sent by the first device 104a as part of the alert signal. Additionally or alternatively, the modifications to the signal may be made by the first user.

FIG. 15 shows an example with just two wearable devices 104a, 104b in the chain. Initiation of the alert may be in response to activation of a "Help" or "SOS" command or button at the first device 104a, or in response to any trigger event as mentioned above, or the likes. Initiation of the alert may put the device 104 into an emergency mode, a signal is transmitted in response to activation of the emergency mode in the embodiment being described. In the embodiment being described, the signal sent when the alert is initiated comprises a local message (for the other wearable devices) and a network message (for the CCN). The signal may therefore be automatically interpreted by different technologies using different communication protocols.

The skilled person will appreciate that the technology used for connecting with CCN and UFN devices need not be the same. In some instances, the technology may be the same but the protocol may be different so that the messages can be easily identified, or parsed, or perform different functions. If connection with the CCN and other UFN devices is lost, in some embodiments the alert may be automatically routed through a specially reserved technology in the case of an emergency to ensure interoperability in the field of use. Examples include but not limited to: VHF radio, cellular, 2 way-GPS (e.g. Cospas-Sarsat) or using proprietary or non-proprietary technologies in licence free radio bands. For example, a specific radio frequency on which a local source of assistance is known to be listening, optionally a channel reserved for emergency services, may be used. The system may therefore use licence-free communication when it can connect to a UFN and/or CCN (optionally with different protocols) and through a 2 way-GPS in the case of an emergency out of local network reach.

In alternative embodiments, the signal may only comprise a network message and whatever metadata, header or the likes as may be required to cause the other wearable devices to relay the network message appropriately. The local message and network message may be of different message types and/or generated according to different communication protocols, or may be the same. The skilled person will appreciate that the same message types may be understood by both CCN devices (e.g. the access point 1102) and mesh network devices 104 (the wearable devices 104a-d); in some embodiments, the signal may comprise a single message interpretable by both. In the embodiment being described, the local and network messages are sent on different frequencies within a band, for example within a license-free band such as the 868 MHz band in some countries. The skilled person will appreciate that suitable frequencies and bands generally vary between countries. The skilled person will appreciate that using similar frequencies may allow the same chip set to be used for both, even with relatively simple and/or inexpensive chip sets, which may reduce costs as compared to requiring different chip sets. The skilled person will appreciate that the same frequency band may be used for near-filed (mesh network) and longer distance (CCN) communications.

In the embodiment being described, the first wearable device 104a is arranged to broadcast one or more message types until it receives (directly or indirectly) authentication from the network access point 1102 confirming that the data has been received. In the embodiment being described, during an SOS event, other users nearby are notified via their wearable devices 104a-d (a limit for the number notified, and or a radius within which notification are provided, may be set). The number and/or identity of devices alerted can be appended onto the message and forwarded on via Network and Local channels (and optionally returned to the first wearable device 104a with the authentication).

In the embodiment being described, once the signal has been received and authenticated by the access point 1102, the signal is no longer passed on by local channels and the authenticated message is passed back down the chain to the original device 104a. If there are no other devices 104 within range, in the embodiment being described, the device will retry until the message has been spread.

If the connection in the chain is broken after the message is sent then there may be no way of authenticating a received message. In the embodiment being described, once the device 104c which managed to successfully reach the access point 1102 has received the authentication, it will try the reverse of the above process to pass on the authentication to the original device 104a. In some embodiments, the access point 1102 may be configured to send the authentication to a different wearable device 104 if the wearable device 104 that sent the message to the access point 1102 loses connectivity between sending and authentication. The different wearable device may then relay that authentication message. The skilled person will appreciate that the wearable devices 104 can be used for walkie-talkie style device to device communications via the mesh network as well as for communications with an external network (the CCN).

In the embodiment being described, each wearable device 104 comprises a position sensor (e.g. a Global Navigation Satellite System (GNSS) receiver, for example for GPS). The position of the wearable device 104a for which the alert is initiated is transmitted as a part of the signal in the embodiment being described.

In the embodiment being described, the wearable device 104 comprises one or more sensors arranged to collect data on a user; e.g. one or more of pulse, blood pressure, breathing rate and voice recordings. User information, such as vital signs, may be transmitted as a part of the signal in the embodiment being described.

In the embodiment being described, the user of the wearable device 104 may provide additional information to be transmitted as a part of the signal—for example a voice recording, text entry, or camera image. This may be used to provide information useful to a search and rescue team, for example, or information on what manner of assistance is required.

In the embodiment being described, the wearable devices 104 communicate with each other via radio communications. In the embodiment being described, the device to device connectivity is ten miles. Wearable devices 104 can therefore be up to ten miles apart and still communicate via the mesh network. In alternative embodiments, the wearable devices may have a range of up to 1 mile, up to 2 miles, up to 5 miles, up to 20 miles, up to 30 miles, or the likes.

In the embodiment being described, when the wearable device 104 is not in the emergency mode (i.e. when an alert has not been initiated, or after an alert has been dealt with) the primary connection for that device may be the connection to the CCN via the access point 1102. In the embodiment being described, when the emergency mode is activated, the wearable device 104 automatically switches to connecting with both local and network connections with the intention of improving reliability of communications and so response times—the skilled person will appreciate that response times may be crucial in the case of accident, injury or dangerous conditions and that the wearable devices 104 and access point 1102 may therefore have particular utility as a safety system; a system used to improve safety by providing more reliable communications than e.g. a wearable device not able to use a UFN to reach an access point if too remote to contact the access point directly. The skilled person will therefore appreciate that embodiments described herein may allow the effective range of the centrally controlled network to be extended by means of the mesh network.

Example use case 1: Skiers at a ski resort (who may or may not know each other) are each provided with a wristband (wearable device 104) with an information button and a panic button. If the information button is activated, the wristband 104 is arranged to send a request to an access point 1102 in the ski resort's safety/control office and a voice channel is then opened for information to be relayed. If the panic button is activated, the wristband 104 is arranged to broadcast the wristband location to the access point 1102 and other wristbands 104 of other users. If the wristband 104 is within range of the access point 1102, the same steps are taken as before (potentially on a different channel or with an urgency flag to change priorities on incoming messages). If the wristband 104 is out of range of the access point 1102, the message is relayed to the access point 1102 via one or more wristbands 104 of other skiers on the slope, so using those wearable devices 104 as a mesh network. In some embodiments, some or all of the other skiers may remain oblivious of the alert being passed via their wristbands. In some embodiments, nearby skiers, experienced skiers within a set radius, a first aider, or the likes, may be alerted to the user in trouble via the wristband 104 in addition to the request for help sent to the control office. First responders may therefore be alerted as well as more remote services.

Example use case 2: A method of tracking performance of entrants to mass participation events such as a Triathlon or Marathon. The geofencing system offers enhanced connectivity between race organisers and athletes, providing S.O.S functionality alongside location and motion tracking.

Another feature of the system 100, 200 is the ability to connect athletes with their support teams during an event to monitor performance and fatigue. It may also be beneficial to event organisers/sponsors to be able to enhance the viewing experience of fans by providing live data from the athlete and overlaying over the sports content.

In the embodiment being described, the device 104 has the capability of broadcasting data captured by GNSS, on-board sensors or through e.g. remote Bluetooth sensors wirelessly to an access point 1102 up to 10 km away. An athlete's performance can therefore be tracked in real-time over relatively large distances.

Example use case 3: A method of tracking employees working in dangerous or isolated areas. The device 104 provides each user 108 with the ability to call for help whilst the employer can track their movement to ensure they are not entering restricted areas whilst on site.

Note: Both UFN and CCN networks can work indoors, which is generally off limit to GPS function. For example, three repeaters may be set up within the indoor environment at known locations and used to triangulate the location of the device 104.

On-Board Processing of Geo-Location

In tracking embodiments, it is generally preferable to broadcast the location of the device 104 as frequently as possible in order to keep the data as up-to-date as possible. In embodiments being described, the frequency of device broadcast has to be reduced as the number of devices 104 on the same channel increases. This issue is caused by the reduction of free airtime. This issue is made worse when messages are authenticated (checked at both ends) under current protocols because if there is a collision "over the air" both messages become corrupt and the affected devices 104 continue to resend until the message is correctly synchronised, further reducing airspace.

Prior art tracker products generally rely on a master product comparing the location of a slave device to a user-defined geofence. Usually, the slave device regularly sends its location to the master device (normally a smartphone) which is compared to the geofence on a map. If the position of the slave device has changed in relation to the geofence, the status should be updated and the master sends a message to the slave informing it that it has left the geofence. Whilst this approach currently works reasonably well for cellular devices, which have plenty of airspace, it is not a good solution for radio communications for the following reasons:

1. Device must broadcast regularly to check if it is inside the geofence (airspace issue);
2. Access Point must broadcast a response regularly (airspace issue);
3. Device must be listening for status messages all of the time (battery power drain); and
4. Messages may be corrupt and have to resend which can be slow (efficiency and airspace issue).

The most obvious solution is to hop between broadcast channels to reduce load on the single channel. The master device can listen on multiple channels then respond using a reserved channel as shown in FIG. 13.

Figure 13:
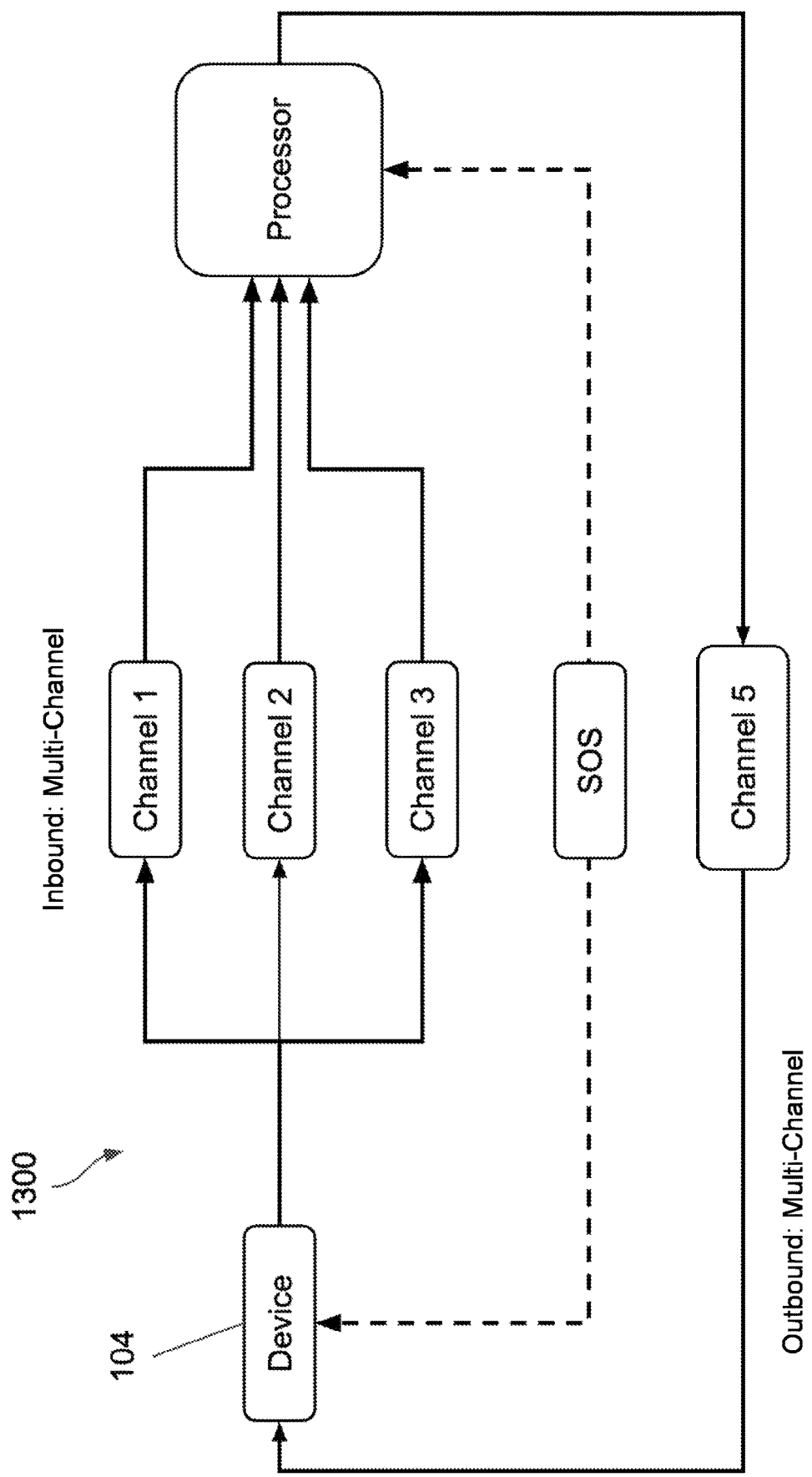
FIG. 13 shows an alternative communications diagram with an additional emergency ("SOS") channel.

The system of FIG. 13 is different from that of FIG. 12 because the outbound signal can be multichannel which allows one channel to be reserved for SOS messages, the SOS channel can be two way as airtime should be limited.

In systems 100, 200 of embodiments of the present invention, the device 104 is able to download geofences 106, or geofence data to enable the device 104 to determine geofences 106, and to process the location of the device 104 in relation to the geofence 106. The master-slave relationship of the prior art is therefore not required and the status only needs to be updated on the access point (if present) or device 104 when the device 104 enters or leaves the geofence 106. In many embodiments, if the status of the device 104 changes to S.O.S (i.e. an emergency status) at any point, a message is broadcast instantly and the update rate is increased. This reduction in broadcast frequency can extend battery life, free up airspace and remove a deleterious feedback loop.

The on-board processing can be particularly useful for event race timing, for example. The athlete is given immediate, real-time information on progress and this is broadcast to race officials and/or other participants at set intervals. The reduction in broadcast frequency does however mean that the route of the user 108 with the device 104 shown on the map on a remote device (e.g. an access point 1102 or a paired device 104a-d) is sometimes out of date.

In the embodiment being described, the device 104 is able to record data on-board, simplify the data, and therefore broadcast the data in a smaller number of messages. The route can therefore be recorded accurately even with fewer updates and a smaller total update size. In various embodiments, library logic is used in message strings to shorten complex messages, so reducing the total update size. Table 1 shows an example:

TABLE 1

| | | | Message String | | | | |
|---|---|---|---|---|---|---|---|
| Header | Type | Absolute | differential | differential | differential | differential | footer |
| | LAT | 4717.112671<u>4</u> | 5 | 6 | 6 | 8 | |

The above message example shows a method for reducing the amount of data that is sent in each message by providing differential values. The "Type" field identifies the library to use in order to decode and store the data (in this case. "LAT", i.e. latitude). In the case of a runner where multiple positions (roughly 10 s intervals) would be updated every 3 minutes at 10 mph only the last value is required (the underlined "4" in the "Absolute" column). This method enables more coordinates to be contained within a single message. The above message format also allows compound messages to be created in which a single message can hold multiple message types at different frequencies.

In order for the device 104 to have up-to-date geofences 106 stored in its memory and to keep listening time to a minimum, all entities (i.e. wearable devices 104-104d, any access point 1102, server 1108 and the likes) listen for and/or broadcast updated co-ordinates at a specified time in various embodiments. In some such embodiments, the entities use an onboard real-time clock or the GNSS and a hardcoded time sequence in order to ensure they are all synchronised and transmitting/listening at the same time. In the embodiments being described. GNSS is used to provide a timestamp with every connection. The timestamp can be logged or updated on the or each device 104 in a component called the realtime clock. This approach can be used to synchronise devices 104. The hard-coded time sequence may be set by an administrator, e.g. an event organiser setting the start time for a race, a lifeguard setting a suitable frequency, or the likes. Future listening/transmitting times may be adjusted by a configuration message sent by the administrator (or by any user 108 in examples without an administrator).

The use of set listening/transmitting windows can be applied to updating the geofence coordinates as discussed with respect to moving markers 102, for example for the embodiments shown in FIGS. 1 and 2, and associated triggers (e.g. updating an offset, r) as outlined above. The skilled person will appreciate that the geofencing system 100, 200 can provide additional options and that the use of set listening/transmitting windows can be used for a much broader range of communications and updates than simply geofence updates.

In embodiments in which an app is used, the additional options can be defined in the app and relevant data can be input to, or be uploaded to, the device 104. As additional data is being transferred and airtime is limited, preferred embodiments use libraries to keep the amount of data transferred to a minimum. In such embodiments, each device 104 is provided. e.g. via Cable or Bluetooth (a high data rate method), with a firmware suitable for a multitude of applications. The firmware can include an expansive list of libraries and tables which allow the device's behaviour to be altered based on triggers. The behaviour of the device 104 can be altered by incoming messages as described in the method above and/or by onboard triggers. Various examples of triggers as used in conjunction with libraries are outlined below:

Incoming instruction/request
- New geofence coordinates can be provided, or those of an existing geofence 106 can be updated, at a specific time and written to the device's onboard geofence table. The tables hold information about active and/or inactive geofences including a field that instructs the device to perform an action based on crossing the geofence 106.
- Geofences 106 can be toggled on/off (i.e. activated or deactivated) using this method.

Other instructions can be sent over the air using the method above to request data from a device, e.g. What is the current battery status?

Geofence—The current GPS position of a device 104 is compared to known coordinates in the geofence table. If the geofence 106 is breached, an associated reaction is triggered (e.g. an alert or alarm).

Sensor input—Devices 104 may be capable of connecting to a range of sensors (e.g. geo-sensors 1106—see below). Sensor parameters are stored in a library stored on, or accessible to, the device. If the sensor is active and detects the desired value it triggers a reaction e.g. gas sensor senses gas and resultantly sends an alert.

User input—Devices 104 may have a button or the likes (e.g. slider, touch-screen interface or the likes) for attracting attention. The button function (Trigger) can be changed by selecting a different function from the library.

The frequency of listening/transmitting and/or the duration of each window can also be modified by a configuration message. The skilled person will appreciate that there are various benefits of using synchronous communications and libraries in various embodiments, including the following examples.

1. Complex Function Activation

A potential benefit of using libraries in embodiments the ability to activate complex functions by sending a short instruction, thus reducing airtime and battery consumption. Functions are stored in the library and selected by the instruction.

2. Linking Library Functions to Geofences

Example use case: The swim area of a triathlon is marked as a geofence 106; the swim area geofence 106 is linked to a configuration on the device 104 meaning that its behaviour is made suitable for the activity. Table 2 shows an example of a configuration for the swim zone. This configuration can be linked to the geofence 106 by simply calling the configuration ID (11) rather than specifying all of the details which would take many messages and a lot of time "on-air" to communicate.

The example configuration show n in Table 2 (below) is a snapshot of the information that could be held in a configuration table. The shaded rows of the table show how a trigger causes a change in mode and therefore functionality whilst the unshaded rows show what the device function will be whilst it is in the swim mode. The triggers and function both relate to either the geofence boundary or to the device 104 being in a geofence 106. The skilled person will appreciate that this table, and therefore the mode functionality, could be changed and/or vastly expanded in additional or alternative embodiments. In most such embodiments, it is also possible for configuration details to be updated using a specific configuration message.

3. Activating/Deactivating Stored Geofences Using Library Commands

In some embodiments, geofences 106 are stored in a library, for example stored in the device's memory, and given a unique ID. It is possible to then use the ID in order to link functions through the configuration table.

In various embodiments, a number of geofences 106 are pre-programmed on the device 104 in preparation for use (e.g. by a race organiser before distribution to participants). The geofence 106 can be called using its ID rather than communicating every coordinate, which in some cases this could be in excess of 100+ points of a polygon or the likes. It is also possible to update individual points of the geofence 106 by sending the geofence ID and then the individual coordinate(s) to be updated.

Geo Sensing

A geo-sensor 1106 is a communication-capable device comprising a sensor. In the embodiments being described, radio communication is used and the geo-sensor 1106 transmits the sensor data, and/or an alert when sensor data passes a threshold, to an access point 1102 or to one or more devices 104. Markers 102 may comprise geo-sensors.

In various embodiments, the sensor may be described as an external sensor as it senses conditions not related to the network. In the embodiments being described, the sensor has the ability to sense local environmental conditions and broadcast them to a device 104 or access point 1102.

In the embodiments being described, a geo-sensor 1106 is able to also create automatic geofences (e.g. for either a UFN or CCN, as described above); i.e. the geo-sensor 1106 can function as a marker 102 when activated. e.g. when sensor data passes a threshold. An automatically generated geofence 106, and optionally a warning message, will alert any nearby devices 104 that environmental conditions make a marked area hazardous. A Geo-sensor 1106 may measure, but is not limited to, pressure, tide, snowfall, wind or rain.

Example use case 1: A geo-sensor 1106 positioned on a steep slope may create an automatic geofence 106 once it has determined that the local conditions (e.g. snowfall, temperature and/or wind speed or direction) make the region susceptible to avalanche.

Example use case 2: An anemometer could warn those working on a construction site of danger due to high winds.

TABLE 2

Swim Mode

| Mode | | | Trigger | Value | Multiplier | Frequency | When | Next Mode | Notes |
|---|---|---|---|---|---|---|---|---|---|
| 11 | Input | GPS | Location | 101 | — | — | immediately | 54 | Location 101 indicates the geogate at the end of the swim and changes the configuration geofence stored in a geofence table |
| | | | Location | 102 | — | — | immediately | 55 | Location 102 Indicates the user has left the swim area outside of the defined route and therefore is flagged to race organisers |
| | | | Location | 152 | — | — | immediately | 72 | Location 152 indicates that the user has entered a second lap |
| | | | Location | 153 | — | — | immediately | 73 | Location 153 indicates that the user has entered the third lap |
| | | | Speed | <4 mph | <20 s | — | after 3 mins | 19 | this indicates that the swimmer is travelling faster than possible swim speed |
| | | User defined | Button | Closed | <3 s | — | immediately | 9 | This indicates that when the button is held down for more than three seconds the device should move to SOS mode (9) |
| | | Sensor | Gyroscope | >3 v | <3 s | — | immediately | 9 | If the gyroscope detects no movement then the wearable should move into SOS mode (9) |
| | | | Accelerometer | >100 db | <3 s | — | immediately | 9 | if the accelerometer detects sudden impact the wearable should move into mode 9 |
| | | | Altimeter | <33 mbar | 30 s | — | immediately | 13 | Pressure sensor identifies that the wearable has been submerged deeper than possible transmission depth and should write data to memory |
| | | | Serial | Off | — | — | — | — | inactive |
| | | Radio | Temp | >11 c | <10 s | — | immediately | 12 | Swimming temp too low, Alert officials |
| | | | acknowledgement | >3 s | — | — | after 1 s | 12 | Message not acknowledged by base station, Retry! |
| | | | Configuration message | Off | — | — | — | — | inactive |
| | | Bluetooth | HR data | Off | — | — | — | — | inactive |
| | | System | Battery | >3 v | >1 s | — | — | 14 | Battery low, Alert officials. |
| | Output | Datalogger | — | GPS location | — | 1 sec | — | — | These are outputs that are ongoing in this mode, the device will only move out of this mode based on a trigger in the input area. |
| | | Radio | — | NMEA String | — | 3 mins | — | — | |
| | | Display | — | Swim course | — | constant | — | — | |
| | | Piezo | — | Off | — | Once | — | — | |
| | | Haptic | — | Off | — | Once | — | — | |
| | | Bluetooth | — | Turn HR into datalog mode | — | Once | — | — | |
| | | | — | Turn off Bluetooth | — | Once | — | — | |

What is claimed is:

1. A geofencing system comprising:
at least one physical, moveable marker, the or each marker being arranged to define at least part of a geofence based on the position of the moveable marker such that changing the position of the or each moveable marker changes the geofence, and wherein the or each marker is arranged to be human-portable by an individual for allowing the person to pick up and carry the marker and provide a visible and/or audible indication of the geofence, and the or each marker is arranged to indicate the presence of the geofence and the shape of the geofence; and
at least one wearable device arranged to receive data concerning the position of the geofence,
and wherein the wearable device is arranged to store geofence information and to provide an alert in response to the wearable device crossing the geofence.

2. The system of claim 1 wherein the or each marker indicates a direction in which the geofence extends therefrom, optionally with a clearly visible arrow.

3. The system of claim 1 wherein the system comprises a plurality of markers, and wherein the markers define corners of a polygonal geofence.

4. The system of claim 1 wherein the or each wearable device is arranged to listen at set times to receive updates to the geofence information resulting from movement of one or more of the markers.

5. The system of claim 1 wherein the at least one wearable device is arranged to provide data on a position of the wearable device to the marker and the marker is arranged to log position data of the at least one wearable device.

6. The system of claim 1 wherein the or each marker is powered by an internal battery.

7. The system of claim 1 wherein the or each marker has sensing capabilities, including a capability to detect one or more of wind, certain gases, pressure, and temperature.

8. The system of claim 7 wherein the or each marker is arranged to create or change the geofence based on sensed conditions.

9. The system of claim 1 wherein the or each device has an emergency mode and is arranged to transmit a signal in response to activation of the emergency mode.

10. The system of claim 7 wherein the or each marker is arranged to transmit an alert to the at least one wearable device based on sensed conditions.

11. The system of claim 1 wherein the or each marker is arranged to broadcast a message to at least one of the wearable devices if one of the wearable devices crosses the geofence.

12. The system of claim 11 wherein a GNSS timestamp is used to time broadcasting of the message.

13. A geofencing system comprising:
at least one physical, moveable marker, the or each marker being arranged to define at least part of a geofence based on the position of the moveable marker such that changing the position of the or each moveable marker changes the geofence, and wherein the or each marker is arranged to be human-portable by an individual for allowing the person to pick up and carry the marker and provide a visible and/or audible indication of the geofence, and the or each marker is arranged to indicate the presence of the geofence and the shape of the geofence; and at least one wearable device arranged to receive data concerning the position of the geofence, and wherein the wearable device is arranged to store geofence information and to provide an alert in response to the wearable device crossing the geofence;

wherein the or each marker indicates a direction in which the geofence extends therefrom;

wherein the system comprises a plurality of markers, and wherein the markers define corners of a polygonal geofence;

wherein the or each wearable device is arranged to listen at set times to receive updates to the geofence information resulting from movement of one or more of the markers;

wherein the at least one wearable device is arranged to provide data on a position of the wearable device to the marker and the marker is arranged to log position data of the at least one wearable device.

14. A geofencing system as claimed in claim 13 wherein the or each marker is powered by an internal battery.

* * * * *